US008117342B2

(12) United States Patent
Heredia et al.

(10) Patent No.: US 8,117,342 B2
(45) Date of Patent: Feb. 14, 2012

(54) MEDIA EXCHANGE PROTOCOL SUPPORTING FORMAT CONVERSION OF MEDIA ITEMS

(75) Inventors: Edwin A Heredia, San Jose, CA (US); Vladimir Sadovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1142 days.

(21) Appl. No.: 11/243,125

(22) Filed: Oct. 4, 2005

(65) Prior Publication Data

US 2007/0079010 A1    Apr. 5, 2007

(51) Int. Cl.
*G06F 15/16* (2006.01)

(52) U.S. Cl. ........ 709/246; 709/227; 709/228; 709/230; 709/231; 709/232

(58) Field of Classification Search .................. 709/246, 709/227–228, 230–232
See application file for complete search history.

(56) References Cited

U.S. PATENT DOCUMENTS

| | | | |
|---|---|---|---|
| 5,748,736 A | 5/1998 | Mittra | |
| 5,887,193 A | 3/1999 | Takahashi et al. | |
| 5,903,845 A | 5/1999 | Buhrmann et al. | |
| 6,133,908 A | 10/2000 | Scibora et al. | |
| 6,181,342 B1 | 1/2001 | Niblack | |
| 6,233,577 B1 | 5/2001 | Ramasubramani et al. | |
| 6,288,716 B1 | 9/2001 | Humpleman et al. | |
| 6,370,543 B2 | 4/2002 | Hoffert et al. | |
| 6,430,624 B1 * | 8/2002 | Jamtgaard et al. ............ | 709/246 |
| 6,885,362 B2 | 4/2005 | Suomela | |
| 6,922,813 B1 | 7/2005 | Korenshtein | |
| 7,185,199 B2 | 2/2007 | Balfanz et al. | |
| 7,194,701 B2 | 3/2007 | Stavely et al. | |
| 7,206,853 B2 | 4/2007 | Eytchison et al. | |
| 7,231,456 B1 | 6/2007 | Chiba et al. | |
| 7,246,179 B2 | 7/2007 | Camara et al. | |
| 7,310,734 B2 | 12/2007 | Boate et al. | |
| 7,376,333 B2 | 5/2008 | Chung et al. | |
| 7,441,117 B2 | 10/2008 | Matsuzaki et al. | |
| 7,500,104 B2 | 3/2009 | Goland | |
| 2001/0014891 A1 | 8/2001 | Hoffert et al. | |
| 2001/0042107 A1 | 11/2001 | Palm | |
| 2002/0035621 A1 | 3/2002 | Zintel et al. | |
| 2002/0065944 A1 | 5/2002 | Hickey et al. | |
| 2002/0112226 A1 | 8/2002 | Brodersen et al. | |

(Continued)

FOREIGN PATENT DOCUMENTS

CN         1288195        3/2001

(Continued)

OTHER PUBLICATIONS

Non-Final Office Action dated Jan. 12, 2009, in connection with U.S. Appl. No. 11/166,739.

(Continued)

*Primary Examiner* — Jeffrey Pwu
*Assistant Examiner* — Abdelnabi O Musa

(57) ABSTRACT

A media exchange description language (MX-DL) is disclosed. The media exchange description language (MX-DL) may be used to facilitate media exchange within a media exchange network, such as a home network. Methods of determining an operability of a media item within a media exchange network are also disclosed. The methods may utilize the media exchange description language (MX-DL) to convert a media format of the media item into a compatible media format usable within a media exchange network. Devices and device components for performing the disclosed methods are also disclosed.

17 Claims, 9 Drawing Sheets

U.S. PATENT DOCUMENTS

| | | | |
|---|---|---|---|
| 2002/0178304 A1 | 11/2002 | Camara et al. | |
| 2003/0014415 A1 | 1/2003 | Weiss et al. | |
| 2003/0046437 A1 | 3/2003 | Eytchison et al. | |
| 2003/0110369 A1 | 6/2003 | Fish et al. | |
| 2003/0110514 A1 | 6/2003 | West et al. | |
| 2003/0135661 A1 | 7/2003 | Barker et al. | |
| 2003/0200336 A1* | 10/2003 | Pal et al. | 709/246 |
| 2003/0200340 A1 | 10/2003 | Hutter | |
| 2003/0204734 A1 | 10/2003 | Wheeler | |
| 2004/0076120 A1 | 4/2004 | Ishidoshiro | |
| 2004/0093526 A1 | 5/2004 | Hirsch | |
| 2004/0125756 A1 | 7/2004 | Lepore et al. | |
| 2004/0179103 A1 | 9/2004 | Endo et al. | |
| 2004/0205286 A1 | 10/2004 | Bryant et al. | |
| 2004/0254014 A1 | 12/2004 | Quraishi et al. | |
| 2005/0232242 A1 | 10/2005 | Karaoguz et al. | |
| 2005/0258806 A1 | 11/2005 | Janik et al. | |
| 2005/0278442 A1 | 12/2005 | Motoyama et al. | |
| 2006/0005259 A1 | 1/2006 | Isozaki et al. | |
| 2006/0015937 A1 | 1/2006 | Illowsky et al. | |
| 2006/0026167 A1 | 2/2006 | Pasumansky et al. | |
| 2006/0026288 A1* | 2/2006 | Acharya et al. | 709/227 |
| 2006/0036750 A1 | 2/2006 | Ladd et al. | |
| 2006/0129938 A1 | 6/2006 | Humpleman et al. | |
| 2006/0179149 A1 | 8/2006 | Janning et al. | |
| 2006/0179303 A1 | 8/2006 | Gurleyen et al. | |
| 2006/0224901 A1 | 10/2006 | Lowe | |
| 2007/0073837 A1 | 3/2007 | Johnson-McCormick et al. | |
| 2008/0052415 A1* | 2/2008 | Kellerman et al. | 709/246 |
| 2008/0059622 A1 | 3/2008 | Hite et al. | |

FOREIGN PATENT DOCUMENTS

| | | |
|---|---|---|
| EP | 0637157 | 2/1995 |
| EP | 1081897 | 3/2001 |
| EP | 1085433 | 3/2001 |
| WO | 9859282 | 12/1998 |
| WO | 9907111 | 2/1999 |
| WO | 05111869 | 11/2005 |

OTHER PUBLICATIONS

Bradner, Scott, "Considerations on the Extensibility of IETF Protocols" Jun. 4, 2004, http://wiki.tools.ietf.org/html/ draft-iesg-vendor-extensions-02.

Corcoran; Peter, "Mapping Home-Network Appliances to TCPIIP Sockets Using a Three Tiered Home Gateway" Architecture_IEEE Transactions on Consumer Electronics, vol. 44, No. 3, 0811998, Jun. 17, 1998, pp._729-736_University College, Galway, http://www.eee.nuigalway.ie/documents/pc_ieee_trans_consumer_elect_1998_d.pdf.

Guttman, Erik; "Vendor Extensions of Service Location Protocol, Version 2", Jan. 14, 2002, pp._I-7, http://www.rfc-archive.org/getrfc.php?rfc=3224&tag=Vendor-Extensions-for-Service-Location-Protocol%2C-Version-2.

Hullender, Gregory N., "An Efficient Method for Tuning Handwriting Parameters", 2001, http://ieeexplore.ieee.org/stamp/stamp.jsp?tp=&arnumber=953793.

Manders; et al., "Media Transfer Protocol". May 17, 2004. pp. 1-36. http://www.google.com/url?q=http://download.microsoft.com/download/9/8/f/98f3fe47-dfc3-4e74-92a3-088782200fe7/twmd05003_winhec05.ppt&sa=U
&ei=wQBiTYWDL4mc4AbG0fG8CQ&ved=0CB0QFj
AC&sig2=TwqWZOQDu3Z8iF7_43WqpQ
&usg=AFQjCNG3AsC1_zeXzFz4jOUmbCRHv0dgXA.

Satran; et al., "Internet Small Computer Systems Interface". Apr. 2004 http://www.faqs.org/rfcs/rfc3720.html.

Simpson, W., "PPP Vendor Extensions", May 1997, http://tools.ietf.org/pdf/rfc2153.pdf.

Final Office Action in related U.S. Appl. No. 11/166,739 dated Sep. 14, 2009.

Non-Final Office Action in related U.S. Appl. No. 11/166,739 dated Jan. 19, 2010.

Non Final Office Action cited in related U.S. Appl. No. 10/912,096 dated Jan. 8, 2008.

Non Final Office Action cited in related U.S. Appl. No. 10/912,096 dated Jul. 10, 2008.

Final Office Action cited in related U.S. Appl. No. 10/912,096 dated Dec. 16, 2008.

Notice of Allowance cited in related U.S. Appl. No. 10/912,096 dated Apr. 7, 2009.

Notice of Allowance cited in related U.S. Appl. No. 10/912,096 dated Apr. 21, 2009.

Non Final Office Action cited in related U.S. Appl. No. 10/429,116 dated Jan. 16, 2007.

Non Final Office Action cited in related U.S. Appl. No. 10/429,116 dated Jun. 27, 2007.

Final Office Action cited in related U.S. Appl. No. 10/429,116 dated Nov. 28, 2007.

Advisory Action cited in related U.S. Appl. No. 10/429,116 dated Feb. 21, 2008.

Non Final Office Action cited in related U.S. Appl. No. 10/429,116 dated Jun. 24, 2008.

Final Office Action cited in related U.S. Appl. No. 10/429,116 dated Dec. 8, 2008.

Notice of Allowance cited in related U.S. Appl. No. 10/429,116 dated Aug. 21, 2009.

Notice of Allowance cited in related U.S. Appl. No. 10/429,116 dated Dec. 24, 2009.

Non Final Office Action cited in related U.S. Appl. No. 10/836,260 dated Jan. 11, 2008.

Final Office Action cited in related U.S. Appl. No. 10/836,260 dated Jul. 23, 2008.

Notice of Allowance cited in related U.S. Appl. No. 10/836,260 dated Oct. 20, 2008.

Notice of Allowance cited in related U.S. Appl. No. 10/836,260 dated Dec. 16, 2008.

Non Final Office Action cited in related U.S. Appl. No. 10/836,261 dated Apr. 19, 2007.

Final Office Action cited in related U.S. Appl. No. 10/836,261 dated Oct. 11, 2007.

Advisory Action cited in related U.S. Appl. No. 10/836,261 dated Jan. 10, 2008.

Non Final Office Action cited in related U.S. Appl. No. 10/836,261 dated Apr. 14, 2008.

Final Office Action cited in related U.S. Appl. No. 10/836,261 dated Oct. 10, 2008.

Notice of Allowance cited in related U.S. Appl. No. 10/836,261 dated Jan. 15, 2009.

Notice of Allowance cited in related U.S. Appl. No. 10/836,261 dated Mar. 20, 2009.

* cited by examiner

MEDIA EXCHANGE PROTOCOL SUPPORTING FORMAT CONVERSION OF MEDIA ITEMS

BACKGROUND

The complexity of media exchange networks, such as home entertainment networks, continues to escalate. Further, the number of components used in media exchange networks and the increasing variety of media formats used by these components adds to the complexity of media exchange networks, and the ability of components to effectively accept a media format from another component.

Efforts to date have not addressed the need for media exchange networks, such as home networks, to effectively exchange media content from one component to another, especially when the components within the media exchange network operate using different media formats.

SUMMARY

Described herein are, among other things, various technologies for enabling the interoperability of various components in a media exchange network such as a home network. The various technologies include, but are not limited to, a protocol suitable for use by at least one component of a media exchange network, wherein the protocol enables logical exchanges between components within the network; methods of facilitating a media exchange in a media exchange network, wherein the media exchange may involve conversion of an initial set of media content parameters into a more suitable set of media content parameters for a given media exchange network; and devices or device components capable of using the disclosed protocol and performing the disclosed methods within a media exchange network.

This Summary is provided to generally introduce the reader to one or more select concepts described below in the "Detailed Description" section in a simplified form. This Summary is not intended to identify key and/or required features of the claimed subject matter.

DETAILED DESCRIPTION

To promote an understanding of the principles of the networks, methods and devices disclosed herein, descriptions of specific embodiments follow and specific language is used to describe the specific embodiments. It will nevertheless be understood that no limitation of the scope of the disclosed networks, methods and devices is intended by the use of specific language. Alterations, further modifications, and such further applications of the principles of the disclosed networks, methods and devices discussed are contemplated as would normally occur to one ordinarily skilled in the art to which the disclosed networks, methods and devices pertains.

A media exchange description language (MX-DL) is disclosed. The media exchange description language (MX-DL) (i) facilitates the recognition of media content formats from various media sources, (ii) provides media content format conversion capabilities, if needed, during server-client negotiations within a media exchange network, such as a home entertainment network, (iii) enables encoding of raw or partially-raw data from a less powerful device by a more powerful device so that a high-quality version of the media content results from the encoding process, and (iv) enables content encoding by a requested device so that the resulting media content is optimized for the features of a specific rendering device. An exemplary media exchange network, such as a home entertainment network, in which the media exchange description language (MX-DL) can be used is shown in FIG. 1.

Figure 1:
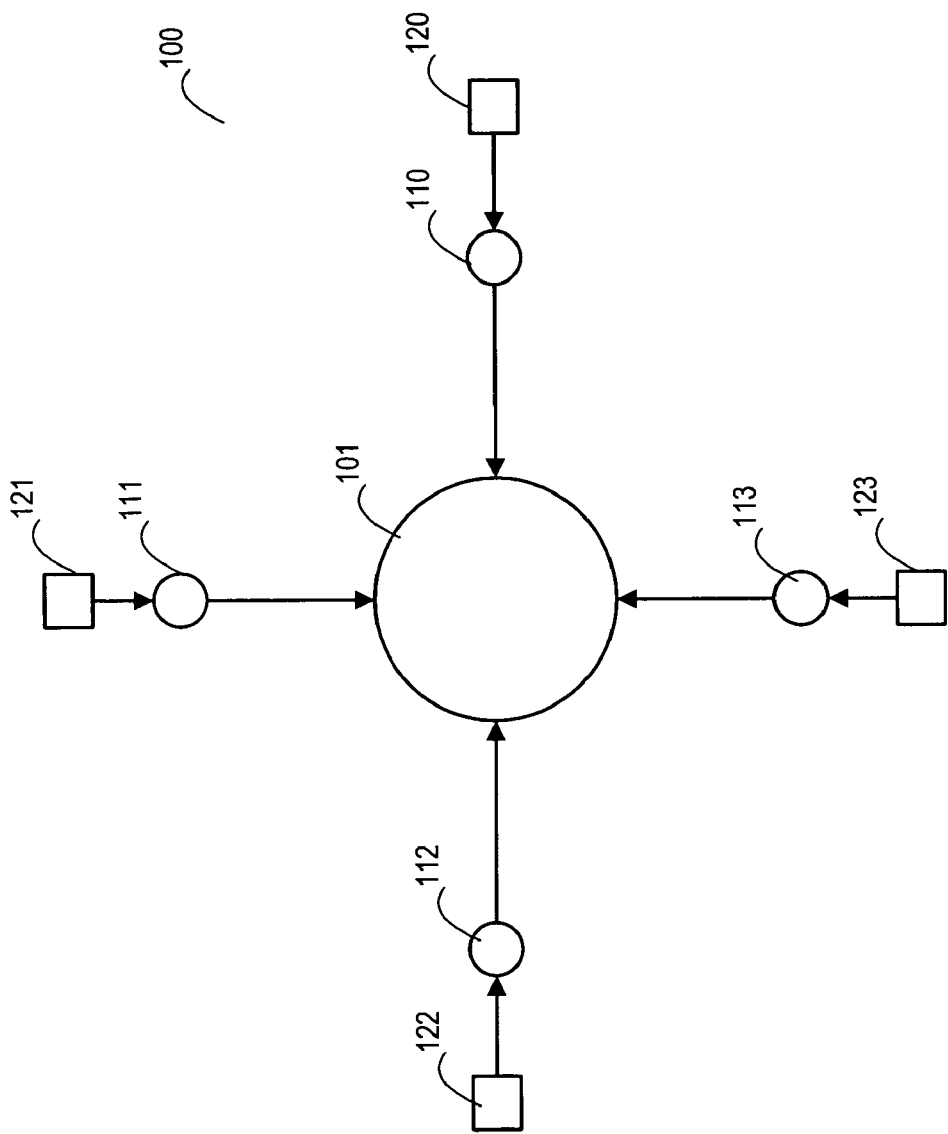
FIG. 1 depicts an exemplary media exchange system showing media content introduced into an exemplary media exchange network from various media sources.

As shown in FIG. 1, exemplary media exchange system 100 comprises media exchange network 101, which receives media content items 110-113 from various media sources 120-123. Exemplary media sources 120-123 may include, but are not limited to, a digital television signal source, a digital radio signal source, DVDs, CDs, digital picture cameras, digital video cameras, Internet video services, Internet radio services, cell phone networks, portable music devices, PDAs, etc. Exemplary media content items 110-113 may include, but are not limited to, a digital television signal, a digital radio signal, a DVD video signal, a CD audio signal, a cellular phone audio or video signal, etc.

Regardless of the source (e.g., media sources 120-123), each type of media content (e.g., media content items 110-113) received by media exchange network 101 comprises a particular selection of parameters for audio, video, or image encoding based on standardized specifications (e.g., MPEG-2, MPEG-4, etc) or based on proprietary specifications (e.g., WMV, WMA, etc). For example, one type of media content may be created when MPEG-2 is used with PAL display features, AC-3 audio, and further processed using Program Stream encapsulation. Digital television signals typically arrive to a tuner device (i.e., the network input device) in the form of time-synchronized streams of MPEG-2 packets, each of which carries encoded audio or encoded video information. The encoded video information itself has been packed in a specific manner. For example, video information of a digital television signal is normally compressed and encoded using MPEG-2 specifications. In a further example, another type of media content may be analog radio signals received by a receiver/decoder, which converts the analog audio signal into a sampled series of bytes (e.g., raw media data). The data may be pre-processed for compression (e.g., semi-raw media data), or fully compressed, encoded, and packaged (encoded media). Devices may choose to exchange raw, semi-raw, or encoded media for different purposes over a given network.

The rules for preparing and packing content can be very complex and are usually defined by standards organizations such as the Advanced Television Systems Committee (ATSC) and the DVD Forum. For example, ATSC defines the preparation and packing of digital television signals in the US, while the DVD Forum defines the preparation and packing of digital video disks. Although both follow the same MPEG-2 rules for preparing video signals, the final content is not interoperable since these organizations tailor the standards to fit their specific purposes.

Given the many different media formats (proprietary or standardized), different encapsulation protocols, and different resource requirements of the types of media content (e.g., media content items 110-113) received by media exchange network 101, media exchange network 101 has to be able to cope with these differences and minimize their interoperability impact on users. The media exchange description language (MX-DL) disclosed herein provides a method of addressing the format multiplicity problems associated with such diverse media content within a given media exchange network.

The media exchange description language (MX-DL) facilitates the recognition of encoding media types for content items, and also enables devices within the network to declare their capabilities for processing media types. The media exchange description language (MX-DL) provides a flexible but consistent protocol in order to describe features that create the diverse types of media content. Further, the media exchange description language (MX-DL) provides the flexibility to enable new types of media content or derived types of media content to be used within a given network.

The media exchange description language (MX-DL) may also be used to allow devices to exchange raw or semi-raw data with the purpose of finding a more powerful device that can help with the actual compression and encoding process. The media exchange description language (MX-DL) may also be used by network devices to exchange content with the purpose of encoding or re-encoding a media item to fit the particular characteristics of a device or a group of devices within the network.

In addition to the media exchange description language (MX-DL), methods of determining the operability of a media item within a given media exchange network are disclosed. In one exemplary embodiment, the method of determining the operability of a media item within a media exchange network comprises the steps of: comparing (i) a set of content parameters associated with the media item and (ii) device capabilities of one or more devices within the media exchange network; if the set of content parameters associated with the media item is compatible with the device capabilities of one or more devices within the media exchange network, making the media item accessible to the one or more devices; and if the set of content parameters associated with the media item is not compatible with the device capabilities of one or more devices within the media exchange network, attempting to convert the set of content parameters into a compatible set of content parameters based on the device capabilities of one or more devices within the media exchange network, and if conversion is possible, converting the set of content parameters into the compatible set of content parameters, and making the media item with the compatible set of content parameters accessible to the one or more devices.

In some exemplary embodiments, the step of converting a set of content parameters into a more compatible set of content parameters may comprise converting a media item, such as raw data or semi-raw data, into a higher quality version of the media item. For example, a first, less powerful device of the network may receive a media item, but not have the hardware functionality to convert the media item into a high-quality media format for use by other components within the network. The first, less powerful device of the network may request a second, more powerful device within the network to perform the data conversion so that a higher quality media item results from the conversion step. The resulting higher quality media item may be stored for future use by one or more components within the network including the first, less powerful device.

In other exemplary embodiments, the step of converting a set of content parameters into a more compatible set of content parameters may comprise having a first device of the network request conversion of a media item by a second device that is capable of converting the media item into an optimized media format for a particular device within the network. For example, the first device of the network may have one or more shortcomings or limitations relating to playback of a media item. The first device may request a second device within the network to perform the media data conversion so that the resulting media item is optimized for use with one or more devices within the network (e.g., the resulting media item has a media format that specifically matches output characteristics of a device or devices within the network). The resulting media item may be stored for future use by one or more components within the network (including the first device). In one embodiment, the resulting media item may be optimized for use in the first device, wherein the conversion compensates for the shortcomings or limitations of the first device. In other embodiments, the resulting media item may be optimized for use in a device other than the first device.

In addition to the media exchange description language (MX-DL) and methods of determining the operability of a media item within a given media exchange network, devices and device components capable of performing the above-described methods are disclosed. In one exemplary embodiment, the device or device component automatically converts media content of a media item from one format to another format as soon as the media item enters the media exchange network. In another exemplary embodiment, the device or device component only coverts the media content of a media item into another format when requested to do so by another device or device component within the media exchange network.

Application programs using the media exchange description language (MX-DL) and methods disclosed herein may be loaded and executed on a variety of media exchange networks or other similar networks, which comprise a variety of media exchange network components. An exemplary media exchange network for practicing the methods disclosed herein is described below.

Exemplary Operating Environment

Figure 2:
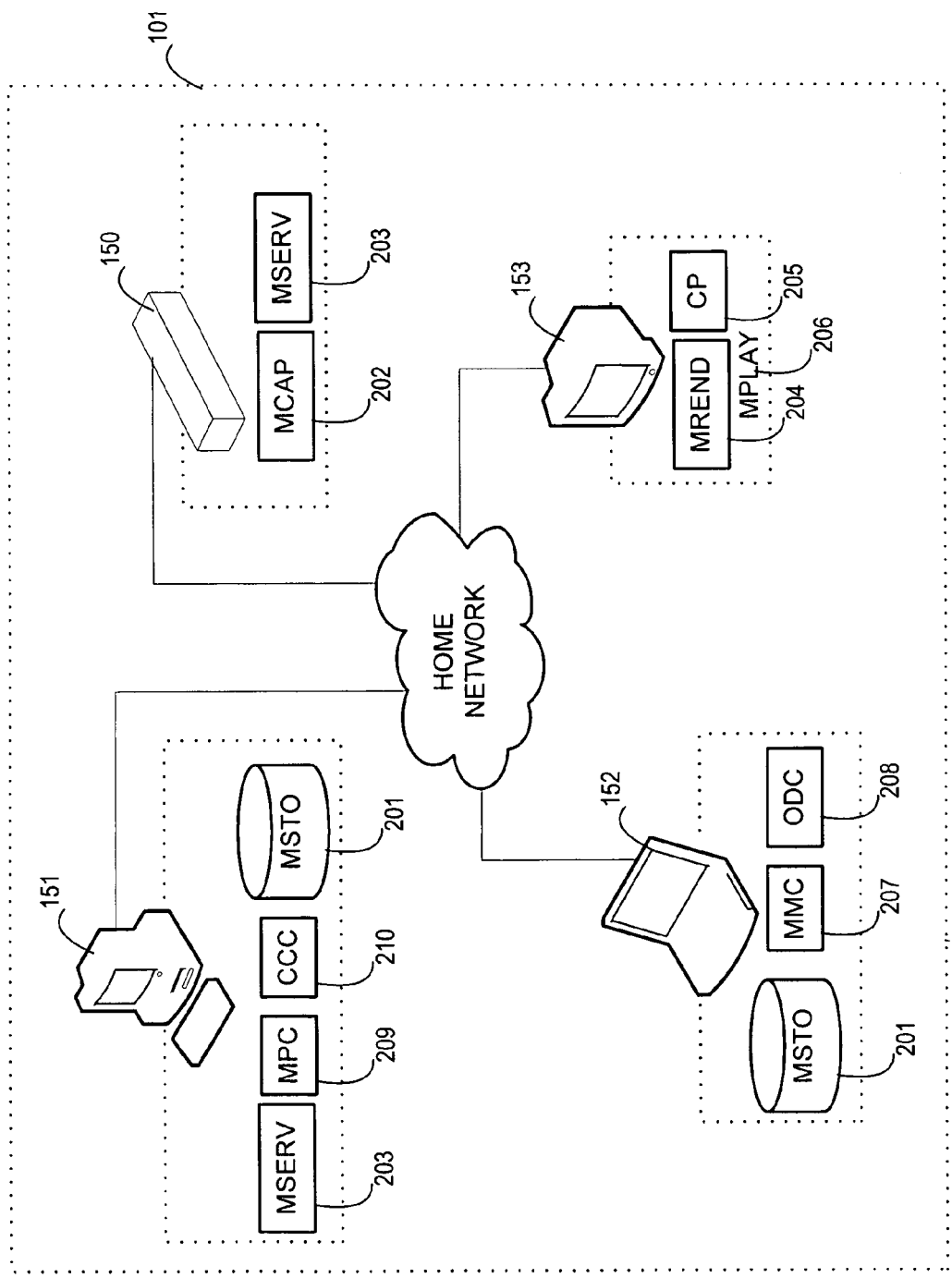
FIG. 2 depicts the exemplary media exchange network of FIG. 1 showing multiple components that may be present within the exemplary media exchange network.

FIG. 2 illustrates an exemplary media exchange network 101 on which the media exchange description language (MX-DL) and methods disclosed herein may be implemented. Exemplary media exchange network 101 is only one example of a suitable media exchange network and is not intended to suggest any limitation as to the scope of use or functionality of the methods disclosed herein. Neither should exemplary media exchange network 101 be interpreted as having any dependency or requirement relating to any one or combination of components illustrated in exemplary media exchange network 101.

As shown in FIG. 2, exemplary media exchange network 101 comprises a number of devices that contain one or more network components. Exemplary devices shown in FIG. 2 include a digital television tuner (DVT) 150, a personal computer 151, a laptop computer 152, and a television or display device 153. Each of these devices may comprise one or more network components that provide a function within exemplary media exchange network 101. Table 1 below provides a summary of exemplary media exchange network components and their roles within exemplary media exchange network 101.

TABLE 1

Exemplary Media Exchange Network Components and Their Roles

| Component | Numerical Designation | Name | Component Role |
|---|---|---|---|
| MSTO | 201 | Media Storage | stores content for later consumption within a media exchange network |
| MCAP | 202 | Media Capture | captures content from the outside with the intent of making it available internally |
| MSERV | 203 | Media Server | delivers content to networked Media Receivers (MRENDs) using streaming or downloading |
| MREND | 204 | Media Receiver | receives content from networked Media Servers (MSERVs) for the purpose of storing or rendering |
| CP | 205 | Control Point | orchestrates the transfer of content from MSERVs to MRENDs |
| MPLAY | 206 | Media Player | combination of MREND and CP |
| MMC | 207 | Media Mirror Converter | converts content from one format to another automatically as soon as content enters the network to maximize availability |
| ODC | 208 | On-Demand Converter | converts content from one format to another based on On-Demand requests from interested entities |
| MPC | 209 | Media Partner Coder | helps with the coding process by receiving raw or semi-raw data and producing the final encoded version of content |
| CCC | 210 | Content Customization Converter | a variation of a MMC or ODC, which converts content to specifically match the features of a device or a group of devices |

As shown in FIG. 2, a device, such as digital television tuner (DVT) 150, may comprise one or more of the network components listed in Table 1 above. Further, a given network component (201-210) may be present in numerous devices within a given media exchange network such as exemplary media exchange network 101. For example, each of personal computer 151 and laptop computer 152 comprises media storage (MSTO) component 201, while each of digital television tuner (DVT) 150 and personal computer 151 comprises media server (MSERV) component 203.

Each of network components 201-210 plays a role in the exchange of media content within exemplary media exchange network 101. As described in Table 1 and with reference with FIG. 1 above, one or more of network components 201-210 are capable of receiving (or capturing) one or more media content items 110-113 from various media sources 120-123 (described above). For example, digital television tuner (DVT) 150, personal computer 151, and laptop computer 152 are all capable of receiving (or capturing) one or more media content items 110-113 from various media sources 120-123 (even though digital television tuner (DVT) 150 is the only device within exemplary media exchange network 101 shown to contain a media capture (MCAP) component 202). Once media content item 110-113 is within exemplary media exchange network 101, media content item 110-113 may be stored in one or more media storage (MSTO) components 201 and/or immediately processed using one or more processing "services" provided by network components 201-210.

In addition to the component roles shown in Table 1, network components 201-210 may provide one or more services in order to communicate with other components and/or facilitate the exchange of media content between communicating components. As used herein, the term "service" is used to define a task that could be performed by one or more of the components for the benefit of other components in the network. From the many services that could be implemented in a given media exchange network such as exemplary media exchange network 101, Table 2 describes services that are of particular importance in the disclosed systems and methods.

TABLE 2

Exemplary Services That Could Be Provided By One Or More Components In A Media Exchange Network

| Service | Service Description |
|---|---|
| Encoding | A type of content conversion: the ability to transform raw uncompressed media data into a compressed binary representation. |
| Transcoding | A type of content conversion: the ability to convert a media item from one codec format to another. |
| Rescaling | A type of content conversion: the ability to scale the resolution of some media item. |
| Transrating | A type of content conversion: the ability to change the media item rate at which the item will be distributed over the network. |
| Streaming | The ability to establish a communication flow where media packets flow at rates equal to or higher than the rate required for rendering. |
| Downloading | The ability to transfer packets at rates that are in general independent of the media item rate. |
| DRM conversion | The ability to translate rights management information and encryption of content items. |

Methods of communicating between network components 201-210 and the use of the media exchange description language (MX-DL) in such methods are further described below.

Although exemplary media exchange network 101 discloses the use of personal computer 151 and laptop 152, it should be understood that the media exchange description language (MX-DL) and methods disclosed herein are operational with media exchange networks containing other general purpose or special purpose computing system environments and/or configurations. Examples of well-known computing systems, environments, and/or configurations that may be suitable for use as a component in a given media exchange network utilizing the media exchange description language (MX-DL) and methods disclosed herein include, but are not limited to, server computers, hand-held devices, multiprocessor systems, microprocessor-based systems, set top boxes, programmable consumer electronics, network PCs, minicomputers, mainframe computers, distributed computing environments that include any of the above systems or devices, and the like.

The methods disclosed herein may be described in the general context of computer-executable instructions, such as program modules, being executed by a computer. Generally, program modules include routines, programs, objects, components, data structures, etc. that perform particular tasks or implement particular abstract data types. The methods disclosed herein may also be practiced in distributed computing environments where tasks are performed by remote processing devices that are linked through a communications network. In a distributed computing environment, program modules may be located in both local and remote computer storage media including memory storage devices.

Exemplary media exchange network 101 and components 201-210 therein utilize a variety of computer readable media (not shown). Computer readable media can be any available media that can be accessed by exemplary media exchange network 101 and network components 201-210 therein, and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by exemplary media exchange network 101 and network components 201-210 therein.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media as used herein and as utilized in exemplary media exchange network 101 and network components 201-210 therein.

Personal computer 151, laptop 152, or any other computing system used in a given media exchange network may comprise computing system components commonly found in known computing systems. Such components include, but are not limited to, system memory, which includes computer storage media in the form of volatile and/or nonvolatile memory such as read only memory (ROM) 131 and random access memory (RAM); a basic input/output system (BIOS) containing the basic routines that help to transfer information between elements within a computer; a processing unit; an operating system; application programs; other program modules; program data; a hard disk drive; a magnetic disk drive; an optical disk drive; magnetic tape cassettes; flash memory cards; digital versatile disks; digital video tape; solid state RAM; solid state ROM; one or more input devices such as a keyboard and a pointing device (i.e., a mouse, trackball or touch pad); a monitor or other type of display device; and other peripheral output devices such as speakers and a printer.

Exemplary media exchange network 101 and network components 201-210 therein may operate in a networked environment using logical connections to one or more remote computers. Remote computers may include a personal computer, a server, a router, a network PC, a peer device or other common network node, and typically includes many or all of the elements described above relative to personal computer 151 and laptop 152. The logical connections may include a local area network (LAN) and a wide area network (WAN) 173, but may also include other networks. Such networking environments are commonplace in offices, enterprise-wide computer networks, intranets and the Internet.

When used in a LAN networking environment, exemplary media exchange network 101 and network components 201-210 therein are connected to a LAN through a network interface or adapter. When used in a WAN networking environment, exemplary media exchange network 101 typically includes a modem or other means for establishing communications over a WAN, such as the Internet.

As mentioned above, those skilled in the art will appreciate that the disclosed methods may be implemented in other media exchange network configurations, which may include hand-held devices, multiprocessor systems, microprocessor-based or programmable consumer electronics, networked personal computers, minicomputers, mainframe computers, and the like. The disclosed methods may also be practiced in distributed computing environments, where tasks are performed by remote processing devices or components thereof that are linked through a communications network. In a distributed computing environment, program modules may be located in both local and remote memory storage devices.

Implementation of Exemplary Embodiments

As discussed above, a media exchange description language (MX-DL) suitable for use in a media exchange network is disclosed. Further, methods of using the media exchange description language (MX-DL) in a media exchange network are disclosed. Even further, devices and device components capable of using the media exchange description language (MX-DL) in a media exchange network are disclosed. Each of these aspects is described in further detail below.

I. The Media Exchange Description Language (MX-DL)

The media exchange description language (MX-DL) is utilized for at least the following purposes: (1) to describe a media content item that exists in a network device, and (2) to describe the processing or decoding features of a networked device. In one embodiment, MX-DL is used to advertise the media content item features to any potential networked device that might be interested in such a media item. For example, a media content item may exhibit an MX-DL message indicating that the media content consists of the following parameters: (i) Video—WMV Advanced Profile at Level 1; (ii) Audio—WMA Professional with 5.1 channels; (iii) Encapsulation—ASF; and (iv) Content Protection—WM-DRM-ND.

In a further embodiment, MX-DL is used by a networked device to advertise decoding and reception capabilities of the device related to potential media content. For example, a device may declare support for the following parameters: (i) Video—WMV and MPEG-2; (ii) Audio—WMA, WMA Pro, and MP3; (iii) Encapsulation—Transport Streams and ASF; and (iv) Content Protection—None.

The MX-DL language comprises various elements that may be presented in a formatted manner to describe media content parameters, as well as capabilities of network components. A description of the MX-DL language is provided by viewing exemplary messages using MX-DL elements. As used herein, the term "message" is used to refer to a piece of text carrying MX-DL elements and attributes starting with the <mediaXchange> element and finishing with a matching closing element in the form </mediaXchange>. If the piece of text is carried in a single file, then the message becomes an "XML document" and possesses appropriate XML document headers. If the piece of text is embedded in another XML document or is serialized and exchanged among devices in a given network, the piece of text remains in the form of a message.

An exemplary structure of a MX-DL message is provided below.

```
<MediaXchange>
    <Primitives>
        ...
        ...
    </Primitives>
    <Compounds>
        ...
        ...
    </Compounds>
</MediaXchange>
```

EXAMPLE 1

MX-DL Message Showing Primitives and Compounds

As shown in Example 1, the exemplary single message (or document) comprises "Primitives" and "Compounds." As used herein, the term "Primitives" refers to the primitive functionality that a device supports or a primitive codec functionality that has been used to encode a certain content item. Primitives are used to describe baseline codec features, as well as baseline encapsulation features of a given media content. Other Primitives may be used to describe encryption and/or content protection methods. Table 2 below provides a list of Primitives that may be used in a MX-DL message or document.

TABLE 2

Exemplary Primitives For MX-DL Messages or Documents

| Primitive Type | Examples |
| --- | --- |
| Image Codec Primitives | JPEG; PNG; raw |
| Audio Codec Primitives | LPCM; AC-3; AAC; MPEG layers 1, 2 and 3; WMA; WMAPRO; raw |
| Video Codec Primitives | MPEG-2; MPEG-4 Part 2; MPEG-4 Part 10 (also known as AVC or H.264); WMV Version 9; raw |
| Content Encapsulation Primitives | MPEG-2 Program Streams; MPEG-2 Transport Streams; MP4 File Format; 3GPP File Format; ADTS File Format; ASF File Format |
| Content Protection Primitives | WINDOWS Media DRM for Network Devices; DTCP over IP |

As used herein, the term "Compounds" is used to define a given composition of a Primitive that identifies a single compound application. For example, although a set of Primitives may indicate support for MP3, AC-3, and MPEG-2 video, the "Compounds" section of the message may indicate that the only valid A/V combination for a given device is MPEG-2 video with AC-3 audio. The "Compounds" section of the message identifies the capabilities of a given device. Further, if MX-DL is used to describe content encoding, the "Compounds" section of the MX-DL message identifies the collection of Primitives used to encode a content item.

Each Primitive may provide one or more Declarations as shown in Example 2 below.

```
<Primitives>
    <Audio Type="AAC" Profile="LC" Id="A1"/>
    <Audio Type="AAC" Profile="LTP" Id="A2"/>
    <Audio Type="AC-3" Id="A3"/>
    <Audio Type="WMA" Id="A4">
        <Restrictions>
            <MaxBitrate> 192 </MaxBitrate>
        </Restrictions>
    </Audio>
    <Video Type="MPEG4-P2" Subtype="H263" Profile="0"
                Level="10" Id="V1">
        <Extensions>
            ...
            ...
        </Extensions>
    </Video>
    <Video Type="MPEG2" Profile="Main" Level="Main" Id="V2" >
        <Standard> ATSC </Standard>
    </Video>
    <Encapsulation Type="MPEG2-TS" Id="S1"/>
    <Encapsulation Type="MP4" Id="S2" />
    <Encapsulation Type="ASF" Id="S3" />
</Primitives>
```

EXAMPLE 2

MX-DL Message Showing Primitives and Declarations

In Example 2, the Primitive describes a codec format (e.g., "AAC"), and its profile or Object Type (e.g., "LC"). In many cases, this one-line description is enough to describe a device and/or content features of a type of media. In other cases, further description of a device and/or content features of a type of media are provided in the declaration of Primitives by including "Restrictions", "Extensions", or indicating potential Restrictions and Extensions introduced by a "Standards." One example of Restrictions is provided in Example 2 above in which a maximum value is imposed on the bit-rate (e.g., for WMA format). In addition, example 2 shows the use of a <Standard> tag as the means to indicate Restrictions and Extensions applied to a Primitive due to conventional standardization work (for example ATSC standardization). Additional Restrictions may be used on other parameters including, but not limited to, resolutions, frame rates, display formats, and other parameters for video.

The above example also shows Encapsulation Primitives, in this case, Transport Streams and MP4 file format. A device that issues an MX-DL message like that above would indicate support for MPEG-2 Transport Streams and the MP4 file format.

Typical examples of a section on Compounds that could be used with the above Primitive example (i.e., Example 2) are provided below.

```
<Compounds>
    <System>
        <Input>
            <Object Audio="A4" Encapsulation="S3" />
            <Object Audio="A2" Video="V1" Encapsulation="S2" />
            <Object Audio="A3" Encapsulation="S1" />
        </Input>
    </System>
</Compounds>
```

```
<Compounds>
    <Instance>
        <Object Audio="A4" Audio="A2" Video="V1"
            Encapsulation="S3" />
    </Instance>
</Compounds>
```

EXAMPLE 3

Compounds Sections of MX-DL Message for Declaring Device Decoding Capabilities (Top Example), and Media Object Features (Bottom Example)

In the top portion of Example 3, the Compounds section lists primitive combinations that could be decoded by a player device. In this case, the player device can receive (and decode) as an input 3 types of objects:
WMA audio (identified as "A4") with ASF encapsulation (identified as "S3");
A/V that uses AAC-LTP for audio (identified as "A2") and H.263 encoding for video (identified as "V1"), multiplexed using the MP4 file format (identified as "S2"); and
AC-3 audio (identified as "A3" with Transport Stream encapsulation (identified as "S1").

The bottom portion of Example 3 shows the description of a media item and the combination of Primitives used to encode the media item. In this case, the example shows a content item with two audio streams (WMA and AAC-LTP), and one video stream (H.263), encapsulated using ASF file format.

As shown above, each Compound object declaration represents a collection of Primitives with each Primitive identified by its "Id" attribute.

A complete exemplary message showing the baseline structure of MX-DL messages for content description is provided below.

```
<MediaXchange   Use="ContentDescription" Version="1.0">
    <Primitives>
        <Audio   Type="AAC"    Profile="LC"     Id="A1" />
        <Audio   Type="MP3"                     Id="A2" />
        <Video   Type="AVC"    Profile="High"   Level="2"   Id="V1" />
        <Encapsulation         Type="MP4"       Id="E1"/>
    </Primitives>
    <Compounds>
        <Instance>
            <Object Type="Default" />
        </Instance>
    </Compounds>
</MediaXchange>
```

EXAMPLE 4

Example of a Dual Audio, Single Video, A/V Object Declared by a Device Using MX-DL In Example 4, the message is used to describe a media content item ready for network distribution (i.e., purpose 1 described above). In Example 4, the message describes an A/V object with two audio streams encoded using AAC-LC and MP3, and one video stream encoded using H.264 (also known as AVC). The file format is MP4. In Example 4, the object does not use any form of content protection but a content protection Primitive could be added to describe relevant technologies. In this example, by setting the Object Type attribute to a Default value, the message indicates that the media item uses all of the Primitives defined in the message.

The above exemplary messages using the MX-DL language could be used to describe media content of a media item within a media exchange network or to describe the capabilities of a networked device to use particular media formats. The following three examples provide additional illustrations of MX-DL features.

Example 5 below describes a media content item comprising a movie from DVD.

```
<MediaXchange Use="ContentDescription" Version="1.0">
    <Primitives>
        <Video Type="MPEG2" Profile="Main" Level="High" Id="V1">
            <Standard> DVD </Standard>
            <Restrictions>
                <Display> NTSC </Display>
                <Bitrate> 1000 </Bitrate>
            </Restrictions>
        </Video>
        <Audio Type="AC-3" Id=A1">
            <Restrictions>
                <ChannelMode> 3-2 </ChannelMode>
            </Restrictions>
        </Audio>
        <Encapsulation Type="MPEG2-PS" Id="S1">
            <Standard> DVD </Standard>
        </Encapsulation>
    </Primitives>
    <Compounds>
        <Instance>
            <Object Audio="A1" Video="V1" Encapsulation="S1" />
        </Instance>
    </Compounds>
</MediaXchange>
```

EXAMPLE 5

Example of a MX-DL Message Used to Identify a Dual Audio A/V Object Declared by a Network Device In Example 5, a Restriction specifically calls out the fact that this media content item uses AC-3 audio with 3/2 channels. Another Restriction specifically indicates that the display features matches NTSC display parameters.

Example 6 below describes a media content item comprising an ATSC compliant High Definition television stream.

```
<MediaXchange Use="ContentDescription" Version="1.0">
    <Primitives>
        <Video Type="MPEG2" Profile="Main" Level="High" Id="V1" >
            <Standard> ATSC </Standard>
            <Restrictions>
                <Resolution> 1280-720 </Resolution>
            </Restrictions>
        </Video>
        <Audio Type="AC-3" Id="A1" />
        <Encapsulation Type="MPEG2-TS" Id="E1"
            <Standard> ATSC </Standard>
        </Encapsulation>
    </Primitives>
    <Compounds>
        <Instance>
            <Object Audio="A1" Video="V1" Encapsulation="S1" />
```

```
        </Instance>
    </Compounds>
</MediaXchange>
```

EXAMPLE 6

Example of a MX-DL Message Used to Identify an ATSC Compliant High Definition Television Stream In Example 6, a Restriction specifically calls out the fact that this stream uses a resolution of 1280×720, the audio type is AC-3, and the encapsulation format is MPEG-2 Transport Streams as constrained by ATSC standards.

Example 7 below describes an example where a device, such as a personal computer (PC), declares its conversion and decoding capabilities. In this case, the PC acts as an ODC or MMC for certain types of media content, but in addition, the PC behaves like a player for other types of content.

```
<MediaXchange Use="DeviceDescription" Version="1.0">
    <Primitives>
        <Video Type="WMV" Profile="Main" Level="High" Id="V1" />
        <Audio Type="WMA" Id="A1"/ >
        <Encapsulation Type="ASF" Id="E1"/>
        <Video Type="MPEG2" Profile="Main" Level="High: Id="V2" >
            <Standard> ATSC </Standard>
        </Video>
        <Audio Type="AC3" Id="A2">
            <Standard> ATSC </Standard>
        </Audio>
        <Encapsulation Type="MPEG2-TS" Id="E2" >
            <Standard> ATSC </Standard>
        </Encapsulation>
    </Primitives>
    <Compounds>
        <System>
            <Input>
                <Object Audio="A1" Encapsulation="E1" />
                <Object Audio="A1" Video="V1" Encapsulation="E1" />
            </Input>
        </System>
        <System>
            <Input>
                <Object Audio="A2" Video="V2" Encapsulation="E2" />
            </Input>
            <Output>
                <Object Audio="A1" Video="V1" Encapsulation="E1" />
            </Output>
        </System>
    </Compounds>
</MediaXchange>
```

EXAMPLE 7

Example of a MX-DL Message Used to Identify a Multipurpose Device Capable of Media Conversion and Media Receiving (Playback or Storage)

In Example 7, the device admits two system usage modes. In one mode, the device receives a particular input format for storage or playback. This first mode is clearly indicated by the first occurrence of the <System> element in the area of Compounds. In Example 7, the device acts as a content sink (e.g., playback or storage) for WMA audio streams, or combination of WMA/WMV AN streams. In the second mode, the device acts like a converter, changing certain input formats into some output formats. This second mode is clearly indicated by the second occurrence of the <System> element in the area of Compounds where both input and output formats are defined. When acting as a converter, the device is capable of transforming ATSC MPEG-2 television streams (input) into WMA/WMV streams (output) typical of PC systems.

The above-described MX-DL language and elements thereof may be used to identify hundreds of known media content items, and has the flexibility to identify potentially hundreds or thousands of future media content items. At least 150 known media content format combinations have been identified, which could be present within any given media exchange network, such as a home entertainment network. See, for example, the media content format combinations disclosed in "Home Network Device Interoperability Guidelines v1.0", Digital Living Network Alliance, 2004; "Home Network Device Interoperability Guidelines v1.0, Addendum Optional Media Format Guidelines v1.0", Digital Living Network Alliance, 2004; and E. Heredia, "Media Exchange Protocols for Home Networks", IWS 2005/WPMC'05, 2005, the subject matter of each of which is hereby incorporated by reference.

The above-described MX-DL language and elements thereof may be used to identify each of the possible media format parameter combinations disclosed in the above-referenced publications, which are currently used to identify potential media content items for a given media exchange network. The above-described MX-DL language and elements thereof may also be used to identify future media format parameter combinations used to identify future media content items for a given media exchange network.

II. Network Components Capable of Facilitating the Exchange of Media within a Media Exchange Network As shown above in exemplary media exchange network 101 of FIG. 2, a number of components (i.e., network components 201-210) may be present in a given media exchange network. Suitable components include media storage (MSTO) components such as exemplary MSTO components 201, which store, among other items, binary representations of audio, A/V, or images. Media capture (MCAP) components may also be present, such as exemplary MCAP component 201, which capture media content from outside networks (e.g., broadcast, Internet radio, etc) with the purpose of making such media content available to other components within the media exchange network. Specific examples of MCAP components include, but are not limited to, DTV tuners that capture a DTV signal for the purpose of distributing the DTV signal to one or more components within the media exchange network, or a DVD player that reads bit streams from optical media (signal capture) with the purpose of streaming over a home network, or a PC that downloads content from the Internet (the capture process), again with the purpose of later make the content available to media exchange networks. Media server (MSERV) components may also be present, such as exemplary MSERV components 203, which make content (e.g., stored or captured) available to any device within the media exchange network. Media receiving (MREND) components, such as exemplary MREND component 204, take media content available within the media exchange network and (i) render/display such media content, (ii) store the media content for later consumption, or both (i) and (ii). In addition to the above-described components, a Control Point (CP) component, such as exemplary CP component 205, is used to orchestrate transmissions between media server (MSERV) components and media receiving (MREND) components.

As shown in FIG. 2, a single network device may comprise one or more of the above-described components. For example, a digital television (DTV) set designed to capture terrestrial broadcast signals and make them available to the network would have at least two components: a MCAP component and an MSERV component. Similarly, a personal computer (PC) that comprises a TV tuner card, and also provides media content from its hard disk drive will utilize at least the following components: a MCAP component, a MSTO component, and a MSERV component. If the PC is also able to play media content available within the network, the PC will also comprise (i) an MREND component to display audio, video, and images, and (ii) a CP component to connect to and start streaming or downloading from media source devices.

In addition to the above-described network components, a device or device component capable of (1) comparing (i) a first set of content parameters associated with a media item and (ii) device capabilities of one or more devices within a media exchange network, and (2) converting the first set of content parameters into a second set of content parameters for the media item, wherein the second set of content parameters is compatible with the device capabilities of one or more devices within the media exchange network is disclosed. The device or device component may automatically initiate a conversion step, or upon receiving a request for the conversion, proceed with the conversion step.

Exemplary media exchange network 101 of FIG. 2 comprises two devices capable of such a conversion step. As shown in FIG. 2, one device is referred to as a Media Mirror Converter (MMC) (MMC component 207), and the other device is referred to as an On-Demand Converters (ODC) (ODC component 208). The Media Mirror Converter (MMC) captures media content that exists within the media exchange network (i.e., captured or stored media items) and makes the media content available to devices or device components in a different format (e.g., codec, scale, and/or rate). The On-Demand Converter (ODC) also changes the format of media content that exists within the media exchange network, however unlike an MMC, the ODC will do so only when requested by some rendering device (e.g., a Control Point component that orchestrates the transmission of content between a server and a rendering component). Media format conversion may comprise one or more processes including, but not limited to, transcoding, transrating, or re-scaling as described below.

Exemplary media exchange network 101 of FIG. 2 further comprises two additional devices capable of assisting in a media item conversion step. As shown in FIG. 2, one device is referred to as a Media Partner Coder (MPC) (MPC component 209), and the other device is referred to as a Content Customization Converter (CCC) (CCC component 210). The Media Partner Coder (MPC) receives media content in the form of raw data or semi-raw data, typically from another device within the network, and assists in the conversion of the raw data or semi-raw data into a final encoded version of the media item. The Media Partner Coder (MPC) then makes the resulting media content available to devices or device components in a different format (e.g., codec, scale, and/or rate), typically at a higher-quality format than could be obtained using the compression and encoding capabilities of the original device. The Content Customization Converter (CCC) is similar to the above-described MMC and ODC, but is able to convert media content into a media format that specifically matches the output or presentation features of a device or group of devices within the network. For example, the Content Customization Converter (CCC) is able to convert media content into a media format that not only matches the format capabilities of the requesting device, but also matches its presentation features like color ranges, frequency response, audio response patterns, etc., and then make the resulting media content available to the specific devices or device components within the network.

The above-described devices and device components may be used in a variety of media exchange network architectures such as those that typically utilize TCP/IP networks. Specific media exchange networks that may contain one or more of the above-described devices and device components include, but are not limited to, home networks (e.g., home entertainment networks), office networks, devices connected over LAN, MAN, or WAN networks, and devices connected over a network of networks like the Internet; and in general, any type of network that receives and processes media content.

III. Methods of Using the MX-DL Language in a Media Exchange Network

Methods of using the above-described MX-DL language are also disclosed. Suitable methods include, but are not limited to, methods for negotiating communications between network components within a media exchange network; methods of identifying a media item within the media exchange network; methods of identifying the capabilities of a given device to process a media item within the media exchange network; methods of converting a first set of content parameters associated with a media item into a second set of content parameters for the media item, wherein the second set of content parameters is compatible with the device capabilities of one or more devices within the media exchange network; methods of determining the operability of a media item within a given media exchange network; methods of identifying and utilizing a more powerful device (e.g., a device having greater hardware functionality) within a network for a media item conversion step when necessary (e.g., referred to herein as "partnership encoding"); and methods of converting a first set of content parameters associated with a media item into a second set of content parameters for the media item, wherein the second set of content parameters is specifically matched with characteristics, such as output characteristics, of a device or group of devices within the media exchange network (e.g., referred to herein as "content customization").

In one exemplary embodiment, a method of determining the operability of a media item within a media exchange network is disclosed. The method of determining the operability of a media item within a media exchange network may comprise the steps of: comparing (i) a set of content parameters associated with the media item and (ii) device capabilities of one or more devices within the media exchange network; if the set of content parameters associated with the media item is compatible with the device capabilities of one or more devices within the media exchange network, making the media item accessible to the one or more devices; and if the set of content parameters associated with the media item is not compatible with the device capabilities of one or more devices within the media exchange network, attempting to convert the set of content parameters into a compatible set of content parameters based on the device capabilities of one or more devices within the media exchange network, and if conversion is possible, converting the set of content parameters into the compatible set of content parameters, and making the media item with the compatible set of content parameters accessible to the one or more devices.

The method of determining the operability of a media item within a media exchange network may comprise a step of converting one or more parameters within a set of content parameters associated with the media item into a compatible set of content parameters by adjusting one or more parameters within the set of content parameters associated with the media item. The set of content parameters associated with the media item may comprise one or more parameters including, but not limited to, an audio parameter, a video parameter, an image encoding parameter, a content encapsulation parameter, a content protection parameter, a content encryption parameter, a bit-rate limitation parameter, a screen format conversion parameter, display resolution parameters, channel mode audio parameters, number or audio and video channels, geographical display and frequency parameters, geographical standardization parameters, display frame rate parameters, frequency range parameters, color map parameters, signal quantization parameters, chroma parameters, or a combination thereof.

The method of determining the operability of a media item within a media exchange network may further comprise a number of additional steps. Additional steps may include, but are not limited to, receiving a media item from a media source outside the media exchange network, wherein the media source comprises a digital television signal source, a digital radio signal source, a DVD, a CD, a digital picture camera, a digital video camera, an Internet video service, an Internet radio service, a cell phone network, a portable music device, a PDA, or a combination thereof; storing an initial media item or a modified media item (i.e., a converted media item) in a storage component that is accessible to a device capable of utilizing the media item; sending the media item or a modified media item (i.e., a converted media item) directly to a device capable of utilizing the media item or a modified media item (i.e., a converted media item).

Figure 3A:
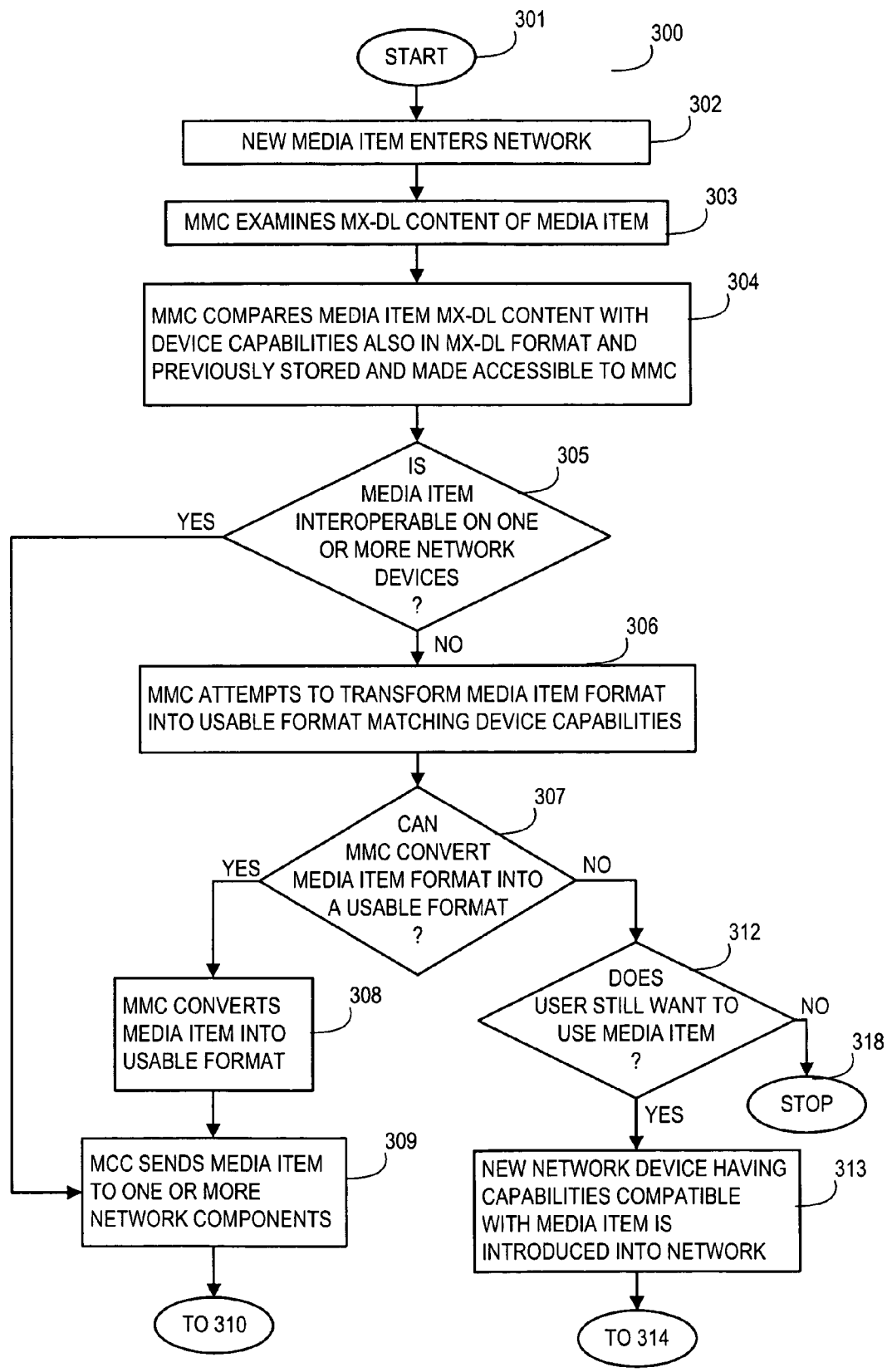
FIGS. 3A-3B represent a logic flow diagram showing exemplary steps in an exemplary method of determining the operability of a media item within a media exchange network containing a MMC (Media Mirror Converter) component.
Figure 3B:
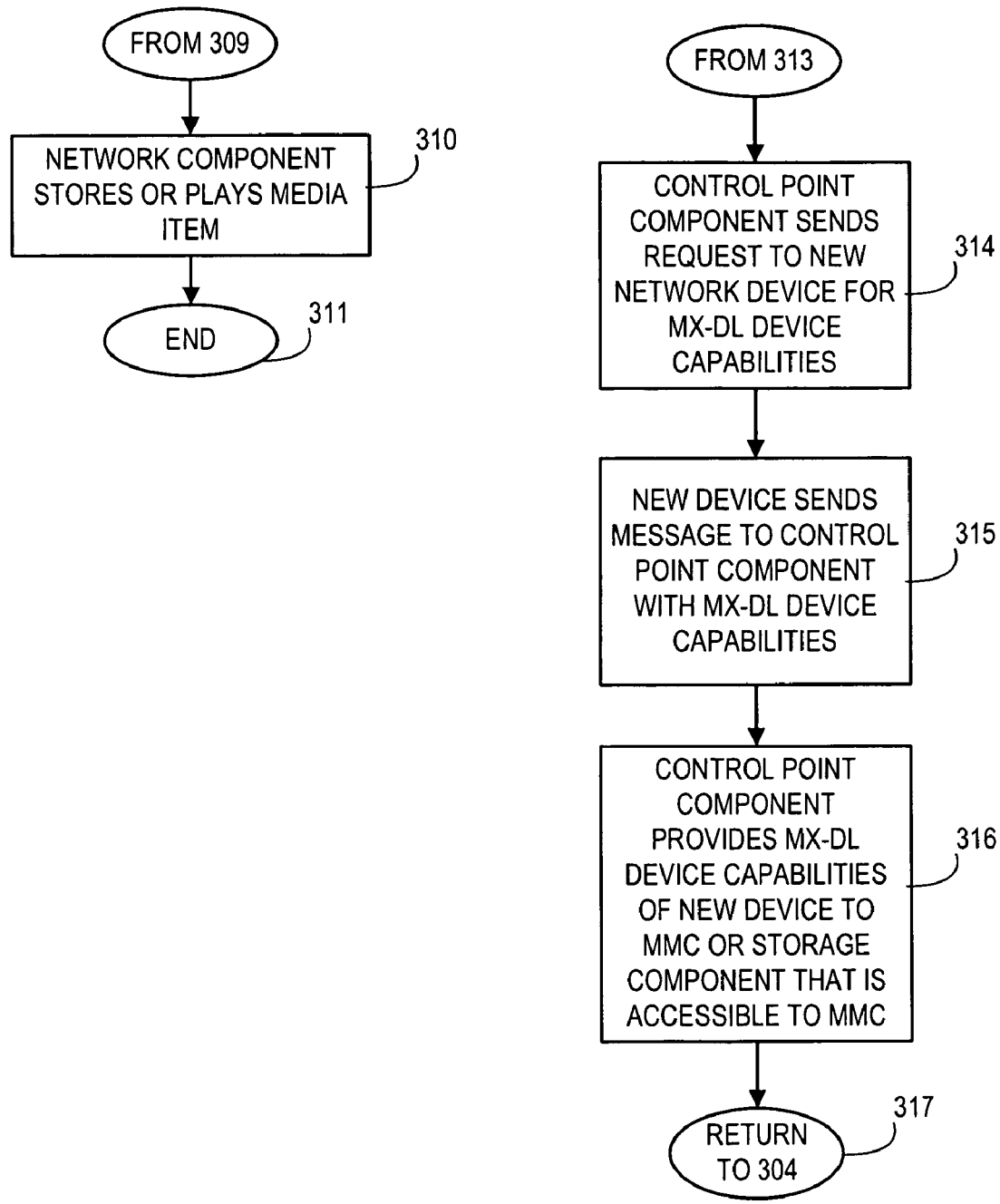

One exemplary method of determining the operability of a media item within a media exchange network is depicted in a logic flow diagram shown in FIGS. 3A-3B. In this exemplary embodiment, the logic flow diagram provides exemplary steps in an exemplary method of determining the operability of a media item within a media exchange network containing a MMC (Media Mirror Converter) component.

As shown in FIG. 3A, exemplary method 300 starts at block 301 and proceeds to step 302. In step 302, a new media item enters into the media exchange network. The new media item may be automatically transmitted to a component within the media exchange network or requested from a component within the media exchange network. Once the new media item enters into the media exchange network, exemplary method 300 proceeds to step 303. In step 303, a Media Mirror Converter (MMC) examines the MX-DL content of the new media item. As described above, the MMC identifies the set of media format parameters used to encode media content in new media item. From step 303, exemplary method 300 proceeds to step 304.

In step 304, the MMC compares (i) the media item MX-DL content with (ii) device capabilities (also in MX-DL format) of one or more devices within the media exchange network. The device capabilities in MX-DL format have been previously stored and made accessible to the MMC. From step 304, exemplary method 300 proceeds to decision block 305.

At decision block 305, a determination is made by the MMC as to whether the media item has a MX-DL content, as represented by a set of content parameters, which is compatible with one or more network devices within the media exchange network. If a determination is made that the media item does not have a MX-DL content that is compatible with one or more network devices within the media exchange network, exemplary method 300 proceeds to step 306, wherein the MMC attempts to convert the media item format into a new, compatible format using one or more processing steps (e.g., transcoding, transrating, re-scaling, or a combination thereof). From step 306, exemplary method 300 proceeds to decision block 307.

At decision block 307, a determination is made by the MMC as to whether the media item format can be converted into a new, compatible format. If a determination is made that the media item format can be converted into a new, compatible format, exemplary method 300 proceeds to step 308, wherein the MMC converts the media item format into a new, compatible format. From step 308, exemplary method 300 proceeds to step 309.

In step 309, the MMC (or the CP of the MCC) sends the media item having a new, compatible media format to one or more network components. Exemplary method 300 then proceeds to step 310 (see FIG. 3B), wherein the one or more network components store or utilize the media item. The one or more device components may store the media item for future use (e.g., a MSTOR component), store the media item prior to being transmitted to a media receiver component (e.g., a MSERV component), or receive the media item for use (e.g., a MREND component or a MPLAY component). From step 310, exemplary method 300 proceeds to end block 311.

Returning to decision block 305 (see FIG. 3A), if a determination is made that the media item does have a MX-DL content that is compatible with one or more network devices within the media exchange network, exemplary method 300 proceeds directly to step 309, wherein the MMC (or the CP of the MCC) sends the media item with its original media format to one or more network components as described above. Exemplary method 300 then proceeds to step 310 and onward as described above.

Returning to decision block 307 (see FIG. 3A), if a determination is made that the media item format can not be converted into a compatible format, exemplary method 300 proceeds to decision block 312. At decision block 312, a determination is made by a user whether to modify the network configuration in order to use the media item. If a determination is made by the user to modify the network configuration in order to use the media item, exemplary method 300 proceeds to step 313, wherein a new network device having capabilities compatible with the media item is introduced into the media exchange network. From step 313, exemplary method 300 proceeds to step 314 (see FIG. 3B).

In step 314, a control point component sends a request to the new network device for device capabilities in a MX-DL format. From step 314, exemplary method 300 proceeds to step 315, wherein the new network device sends a message to the control point component detailing the new device's capabilities (in a MX-DL format). From step 315, exemplary method 300 proceeds to step 316, wherein the control point component provides the new device's capabilities (in a MX-DL format) to the MMC component or a storage component (e.g., a MSTOR component) accessible to the MMC.

From step 316, exemplary method 300 proceeds to step 317, wherein exemplary method 300 returns to step 304 and proceeds as described above.

Returning to decision block 312 (see FIG. 3A), if a determination is made by the user not to modify the network configuration (i.e., not to use the media item), exemplary method 300 proceeds to step 318, wherein exemplary method 300 ends.

Figure 4A:
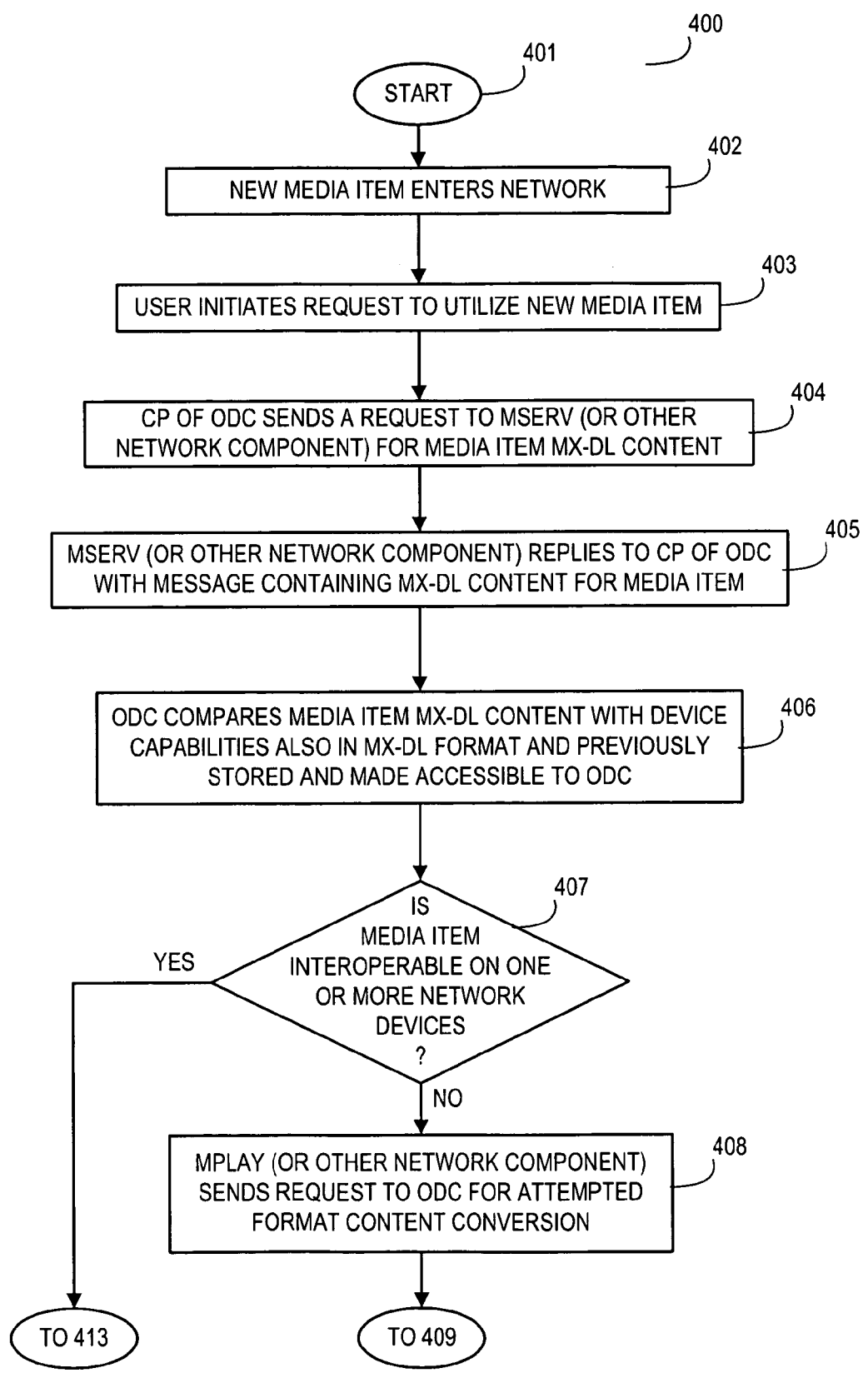
FIGS. 4A-4C represent a logic flow diagram showing exemplary steps in an exemplary method of determining the operability of a media item within a media exchange network containing an ODC (On-Demand Converter) component.
Figure 4B:
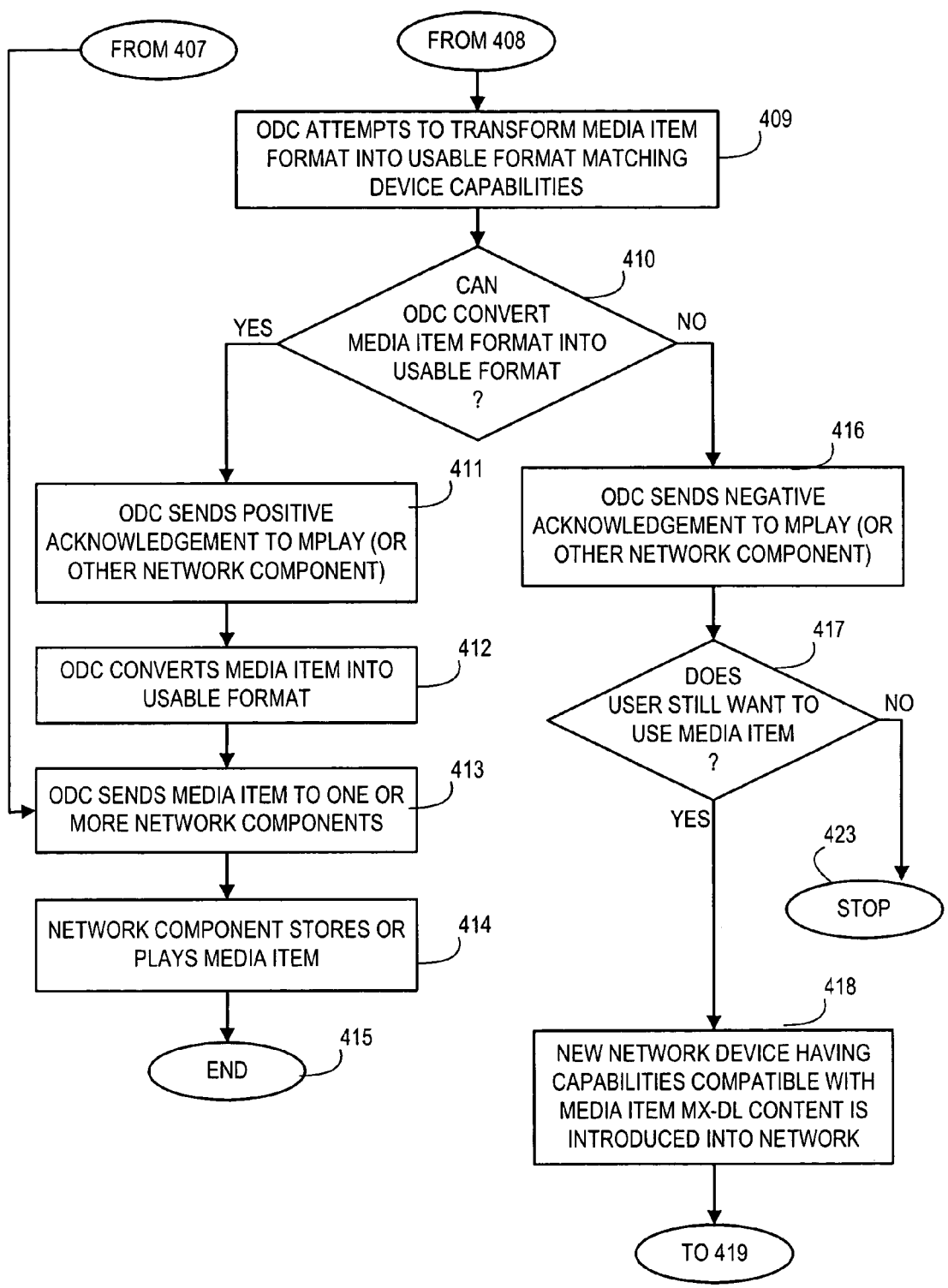
Figure 4C:
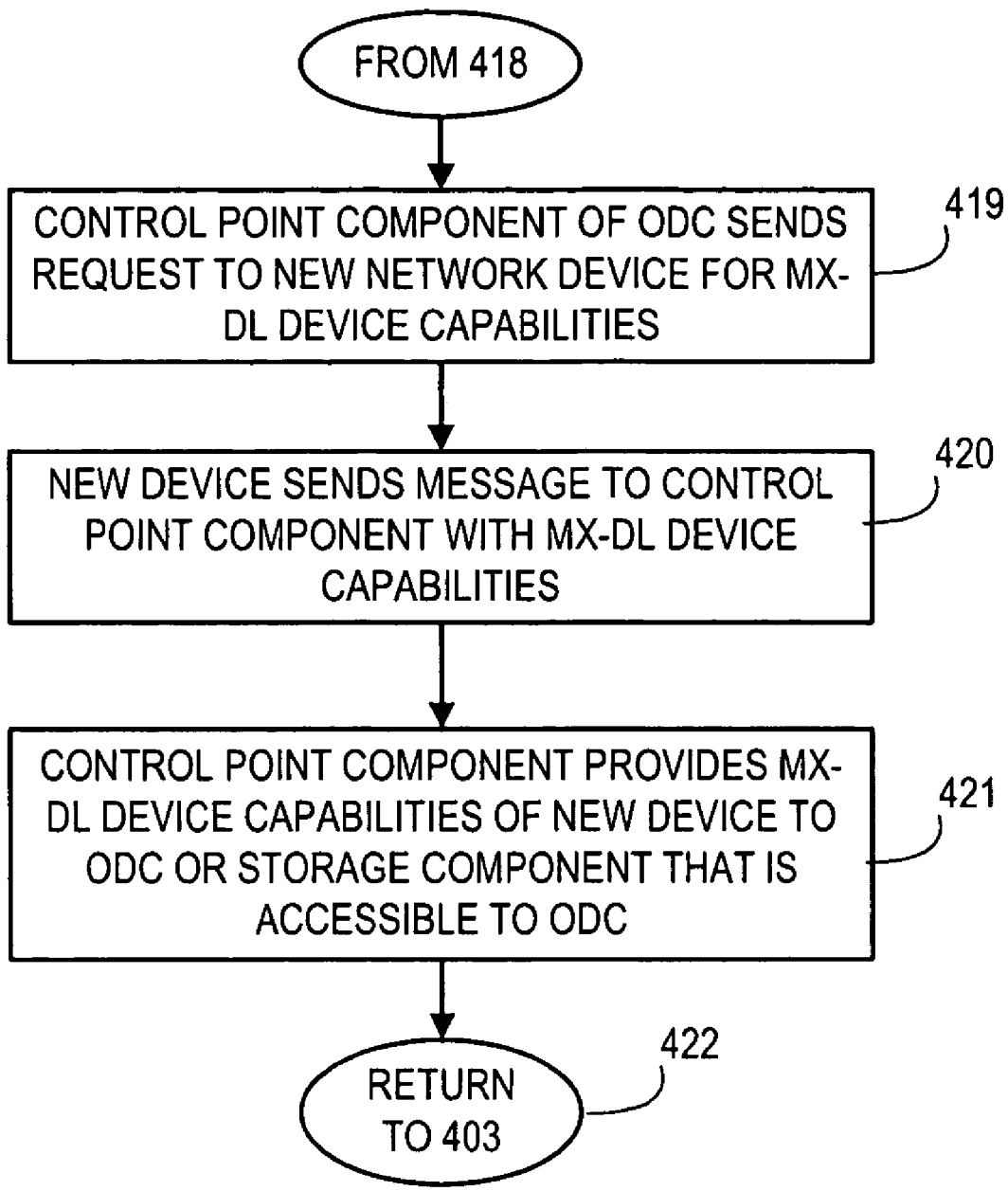

Another exemplary method of determining the operability of a media item within a media exchange network is depicted in a logic flow diagram shown in FIGS. 4A-4C. In this exemplary embodiment, the logic flow diagram provides exemplary steps in an exemplary method of determining the operability of a media item within a media exchange network containing an ODC (On-Demand Converter) component.

As shown in FIG. 4A, exemplary method 400 starts at block 401 and proceeds to step 402. In step 402, a new media item enters into the media exchange network. As discussed above, the new media item may be automatically transmitted to a component within the media exchange network or requested from a component within the media exchange network. Once the new media item enters into the media exchange network, exemplary method 400 proceeds to step 403. In step 403, a user initiates a request to utilize the new media item in one or more network devices. The user may initiate such a request by utilizing a network component having user interface elements or using conventional devices like a remote control or a device's own front panel controls. From step 403, exemplary method 300 proceeds to step 404.

In step 404, a control point (CP) component of the ODC sends a request to a MSERV component (or some other network component) containing the media item for media item MX-DL content information, as represented by a set of content parameters. From step 404, exemplary method 400 proceeds to step 405, wherein the MSERV component (or some other network component) replies to the CP of the ODC with a message containing MX-DL content information for the media item. From step 405, exemplary method 400 proceeds to step 406, In step 406, the ODC compares (i) the media item MX-DL content with (ii) device capabilities (also in MX-DL format) of one or more devices within the media exchange network. The device capabilities in MX-DL format have been previously stored and made accessible to the ODC. The device capabilities in MX-DL format could also be available at any time by request, or could be periodically broadcast to all devices in the network. From step 406, exemplary method 400 proceeds to decision block 407.

At decision block 407, a determination is made by the ODC as to whether the media item has a MX-DL content, as represented by a set of content parameters, which is compatible with one or more network devices within the media exchange network. If a determination is made that the media item does not have a MX-DL content that is compatible with one or more network devices within the media exchange network, exemplary method 400 proceeds to step 408, wherein a MPLAY component (or some other network component) sends a request to the ODC for an attempted media content conversion. From step 408, exemplary method 400 proceeds to step 409 (see FIG. 4B), wherein the ODC attempts to convert the media item format into a new, compatible format using one or more processing steps (e.g., transcoding, transrating, re-scaling, or a combination thereof). From step 409, exemplary method 400 proceeds to decision block 410.

At decision block 410, a determination is made by the ODC as to whether the media item format can be converted into a new, compatible format. If a determination is made that the media item format can be converted into a new, compatible format, exemplary method 400 proceeds to step 411, wherein the ODC sends a positive acknowledgment to the MPLAY component (or some other network component). From step 411, exemplary method 400 proceeds to step 412, wherein the ODC converts the media item format into a new, compatible format. From step 412, exemplary method 400 proceeds to step 413.

In step 413, the ODC (or the CP of the ODC) sends the media item having a new, compatible media format to one or more network components. Exemplary method 400 then proceeds to step 414, wherein the one or more network components store or utilize the media item. As discussed above, the one or more device components may store the media item for future use (e.g., a MSTOR component), store the media item prior to being transmitted to a media receiver component (e.g., a MSERV component), or receive the media item for use (e.g., a MREND component or a MPLAY component). From step 414, exemplary method 400 proceeds to end block 415.

Returning to decision block 407 (see FIG. 4A), if a determination is made that the media item does have a MX-DL content that is compatible with one or more network devices within the media exchange network, exemplary method 400 proceeds directly to step 413 (see FIG. 4B), wherein the ODC (or the CP of the ODC) sends the media item with its original media format to one or more network components as described above. Exemplary method 400 then proceeds to step 414 and onward as described above.

Returning to decision block 410 (see FIG. 4B), if a determination is made that the media item format can not be converted into a compatible format, exemplary method 400 proceeds to step 416, wherein the ODC sends a negative acknowledgment to the MPLAY component (or some other network component). From step 416, exemplary method 400 proceeds to decision block 417. At decision block 417, a determination is made by a user whether to modify the network configuration in order to use the media item. If a determination is made by the user to modify the network configuration in order to use the media item, exemplary method 400 proceeds to step 418, wherein a new network device having capabilities compatible with the media item is introduced into the media exchange network. From step 418, exemplary method 400 proceeds to step 419 (see FIG. 4C).

In step 419, the CP component sends a request to the new network device for device capabilities in a MX-DL format. From step 419, exemplary method 400 proceeds to step 420, wherein the new network device sends a message to the CP component detailing the new device's capabilities (in a MX-DL format). From step 420, exemplary method 400 proceeds to step 421, wherein the CP component provides the new device's capabilities (in a MX-DL format) to the ODC component or a storage component (e.g., a MSTOR component) accessible to the ODC.

From step 421, exemplary method 400 proceeds to step 422, wherein exemplary method 400 returns to step 403 and proceeds as described above.

Returning to decision block 417 (see FIG. 4B), if a determination is made by the user not to modify the network configuration (i.e., not to use the media item), exemplary method 400 proceeds to step 423, wherein exemplary method 400 ends.

It should be understood that the exemplary methods (and the exemplary steps therein) depicted in FIGS. 3A-3B and 4A-4C are two of many possible methods of using the above-described media exchange description language (MX-DL). Other methods may include some of the above-described exemplary steps, all of the above-described exemplary steps, or above-described exemplary steps within additional steps. For example, a user may initiate a request to utilize a media item (see, for example, exemplary step 402), which results in a control point (CP) component of an ODC sending a request to a MSERV component (or some other network component) containing numerous media items, each of which are identified using MX-DL content information represented by a set of content parameters (see for example, exemplary step 403). A MSERV component (or some other network component) may reply to the CP of the ODC with a message containing MX-DL content information for numerous media items, displaying the numerous media items to the user. The user may then select a desired media item from a list of available media items.

Methods of using the above-described MX-DL language may also include methods using the above-described MX-DL language to identify and utilize a more powerful device (e.g., a device having greater hardware functionality) within a network for a media item encoding and compression step when necessary (e.g., referred to herein as "partnership encoding"). For example, consider the case of a networked portable music device (PMD) like a typical MP3/WMA player sold in electronic stores. These devices typically include AM/FM radio tuners, and allow for digital recording of AM/FM radio signals. Because a PMD is typically a very small device with limited hardware functionality, the encoding operation does not include complex technologies like sophisticated digital filtering for noise cancellation, or multiple-pass encoding for maximum compression. The above-described MX-DL language enables a more powerful device, like a personal computer (PC) to help the PMD with the encoding process so as to obtain a high-quality encoded version of the media item. An exemplary method of "partnership encoding" is depicted in FIG. 5 and utilizes a MPC (Media Partner Coder) component as described below.

Figure 5:
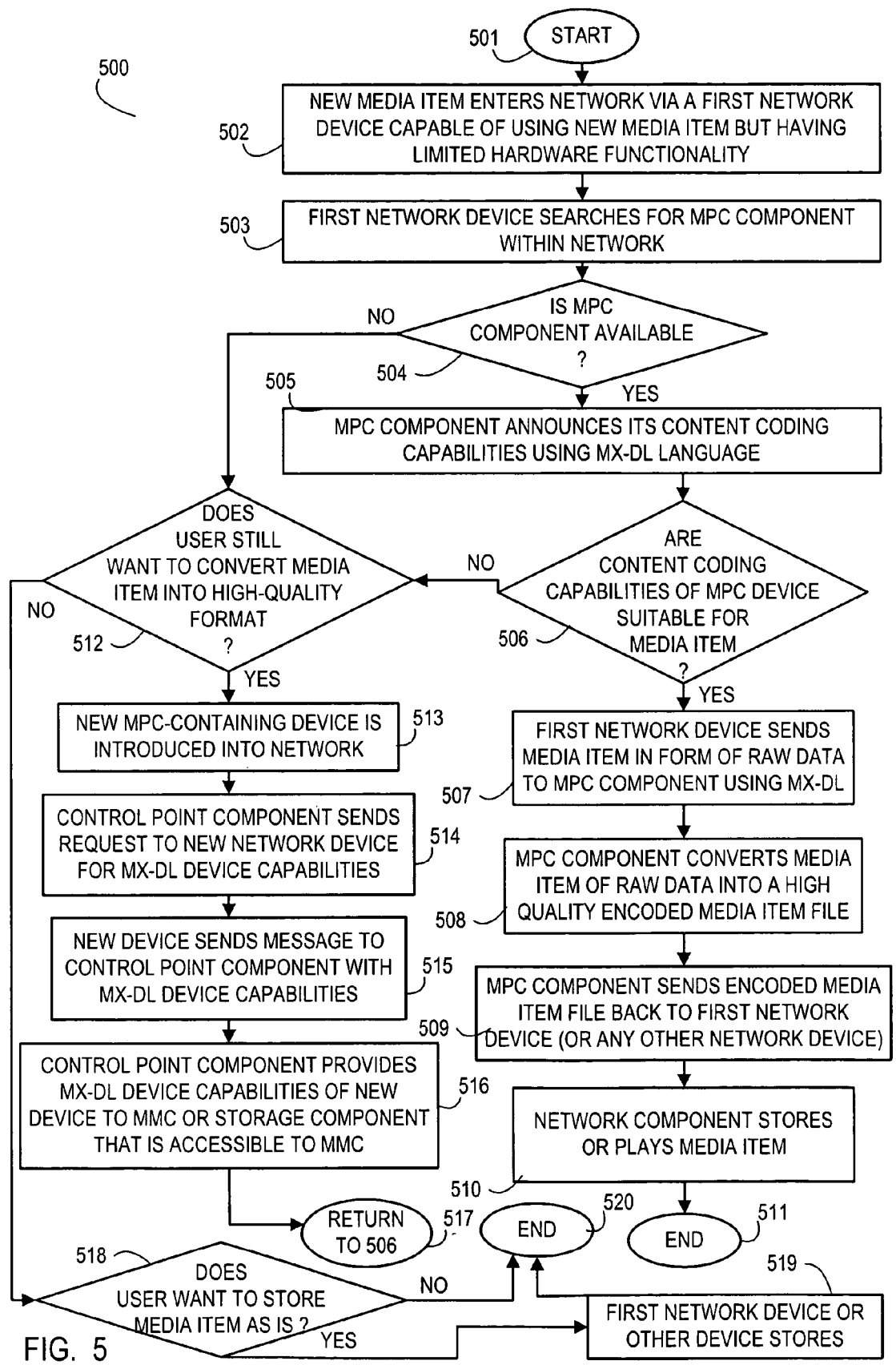
FIG. 5 represents a logic flow diagram showing exemplary steps in an exemplary method of converting a media item from a first format into a second format within a media exchange network containing a MPC (Media Partner Coder) component.

As shown in FIG. 5, exemplary method 500 starts at block 501 and proceeds to step 502. In step 502, a new media item enters into the media exchange network. In this exemplary embodiment, the new media item enters into the media exchange network via a first network device that is capable of using (e.g., playing and/or storing for later use and/or low-quality encoding) the new media item, but has limited hardware functionality. The limited hardware functionality prevents the first network device from converting the new media item into a high-quality media item format (e.g., conversion of raw audio data from a radio input into a WMA format). Once the new media item enters into the media exchange network, exemplary method 500 proceeds to step 503.

In step 503, the first network device searches for a MPC device within the media exchange network. From step 503, exemplary method 500 proceeds to decision block 504. At decision block 504, a determination is made by the first network device or another network device (e.g., a PC) as to whether a MPC component is available within the network. If a determination is made that a MPC component is available within the network, exemplary method 500 proceeds to step 505, wherein the MPC component announces its content coding capabilities to the first network device using MX-DL language. From step 505, exemplary method 500 proceeds to decision block 506.

At decision block 506, a determination is made by the first network device as to whether the content coding capabilities of the MPC component are suitable for use in conversion of the new media item (e.g., available in a raw or unprocessed audio format) into a higher quality compressed and encoded media format (e.g., a WMA format). If a determination is made that the content coding capabilities of the MPC component are suitable for converting the new media item format into a higher quality media format, exemplary method 500 proceeds to step 507, wherein the first network device sends the media item to the MPC component using MX-DL language. From step 507, exemplary method 500 proceeds to step 508.

In step 508, the MPC component converts the unprocessed media item data into a higher quality media form, such as a high quality encoded media item file. Exemplary method 500 then proceeds to step 509, wherein the MPC component sends the high quality encoded media item file to the first network device or any other network device. From step 509, exemplary method 500 proceeds to step 510, wherein the first network device or any other network device stores and/or utilizes (i.e., plays) the converted media item. The first network device or any other network device may store the converted media item for future use (e.g., a MSTOR component), store the media item prior to being transmitted to a media receiver component (e.g., a MSERV component), or receive the media item for use (e.g., a MREND component or a MPLAY component). From step 510, exemplary method 500 proceeds to end block 511.

Returning to decision block 504, if a determination is made that a MPC component is not available within the network, exemplary method 500 proceeds to decision block 512 described below.

Returning to decision block 506, if a determination is made that the content coding capabilities of the MPC component are not suitable for converting the new media item in raw or uncompressed format into a higher quality media format, exemplary method 500 proceeds to decision block 512. At decision block 312, a determination is made by a user whether to continue with efforts to convert the new media item into a higher quality media format. If a determination is made by the user to continue with efforts to convert the new media item into a higher quality media format, exemplary method 500 proceeds to step 513, wherein a new MPC component (or a network device containing a new MPC component) having content coding capabilities suitable for converting the new media item format into a higher quality media format. From step 513, exemplary method 500 proceeds to step 514.

In step 514, a control point component sends a request to the new MPC component (or a network device containing a new MPC component) for device capabilities in a MX-DL format. From step 514, exemplary method 500 proceeds to step 515, wherein the new MPC component (or a network device containing a new MPC component) sends a message to the control point component detailing the new device's capabilities (in a MX-DL format). From step 515, exemplary method 500 proceeds to step 516, wherein the control point component provides the new device's capabilities (in a MX-DL format) to the first network device or a storage component (e.g., a MSTOR component) accessible to the first network device.

From step 516, exemplary method 500 proceeds to step 317, wherein exemplary method 500 returns to step 506 and proceeds as described above.

Returning to decision block 512, if a determination is made by the user not to continue with efforts to convert the new media item into a higher quality media format, exemplary method 500 proceeds to decision block 518. At decision block 518, a determination is made by the user whether to store the new media item "as is" in one or more network devices or to store the new media item using the assumed low-quality encoding and compression capabilities of the first device. If a determination is made to store the new media item "as is" in one or more network devices, exemplary method 500 proceeds to step 519, wherein the new media item is stored "as is" in one or more network devices. From step 519, exemplary method 500 proceeds to end block 520 where exemplary method 500 ends.

Returning to decision block 518, if a determination is made by the user not to store the new media item "as is" in one or more network devices, exemplary method 500 proceeds directly to end block 520 where exemplary method 500 ends.

The above-described process depicted in FIG. 5 may be used to convert audio, video, or any other type of media item utilizing the above-described "partnership encoding" process.

A yet a further exemplary method, the above-described MX-DL language may be used to convert a first set of content parameters associated with a media item into a second set of content parameters for the media item, wherein the second set of content parameters is specifically matched with characteristics, such as output characteristics, of a device or group of devices within the media exchange network (e.g., referred to herein as "content customization"). For example, a networked audio player may provide optimal playback performance for range R1 of frequencies, but provides suboptimal playback performance for range R2 of frequencies. The above-described MX-DL language enables the audio player to pass its output parameters (e.g., limitations) onto other components within the network so that a component can use this information to provide media content encoded in such a way that pre-compensates for the player's deficiency. The media item is re-encoded to match perfectly the characteristics of a given device. This process is referred to herein as "optimal customization." An exemplary method describing an "optimal customization" process is depicted in FIG. 6 and utilizes a CCC (Content Customization Converter) component as described below.

Figure 6:
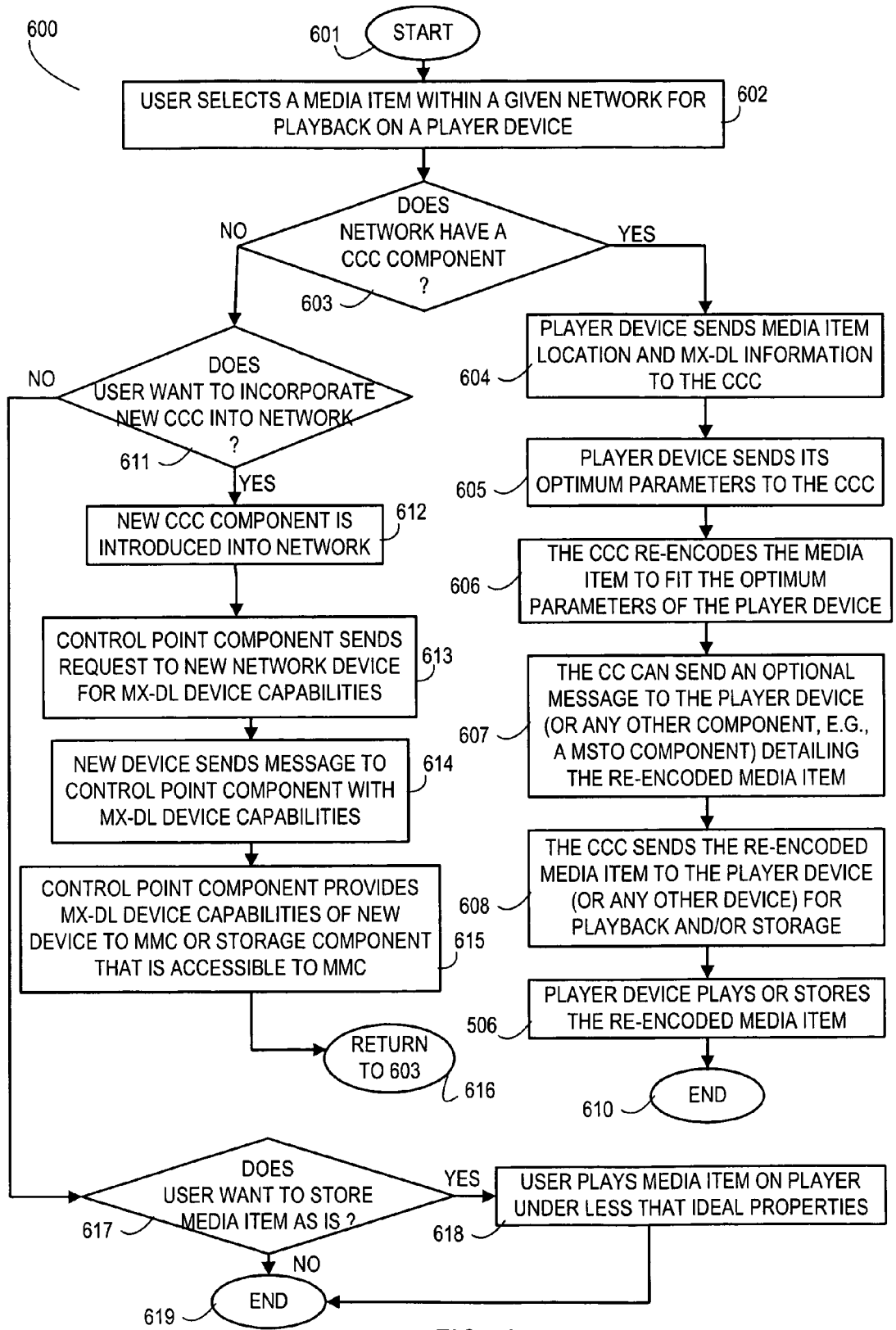
FIG. 6 represents a logic flow diagram showing exemplary steps in an exemplary method of converting a media item from a first format into a second format within a media exchange network containing a CCC (Content Customization Converter) component.

As shown in FIG. 6, exemplary method 600 starts at block 601 and proceeds to step 602. In step 602, a user selects a media item already within the media network for playback on a player device. From step 602, exemplary method 600 proceeds to decision block 603.

At decision block 603, a determination is made by the device or another network device (e.g., a PC) as to whether a CCC component is available within the network. If a determination is made that a CCC component is available within the network, exemplary method 600 proceeds to step 604, wherein the player device sends media item location and MX-DL information to the CCC component. From step 604, exemplary method 600 proceeds to step 605, wherein the player device sends its optimum playback parameters to the CCC component. Exemplary method 600 then proceeds to step 606, wherein the CCC component re-encodes the media item parameters to match the optimum playback parameters of the player device.

From step 606, exemplary method 600 proceeds to step 607, wherein the CCC component can send an optional message to the player device or any other component in the network (e.g., a MSTO component) detailing the parameters of the re-encoded media item. From step 607, exemplary method 600 proceeds to step 608, wherein the CCC component sends the re-encoded media item to the player device or any other component in the network (e.g., a MSTO component) for playback and/or storage of the re-encoded media item. From step 608, exemplary method 600 proceeds to step 609, wherein the player device or any other component in the network plays or stores the re-encoded media item. From step 609, exemplary method 600 proceeds to end block 610, wherein exemplary method 600 ends.

Returning to decision block 603, if a determination is made that a CCC component is not available within the network, exemplary method 600 proceeds to decision block 611. At decision block 611, a determination is made by a user whether to incorporate a new CCC component into the network. If a determination is made by the user to incorporate a new CCC component into the network, exemplary method 600 proceeds to step 612, wherein a new CCC component (or a network device containing a new CCC component) is incorporated into the network. From step 612, exemplary method 600 proceeds to step 613.

In step 613, a control point component sends a request to the new CCC component (or a network device containing a new CCC component) for device capabilities in a MX-DL format. From step 613, exemplary method 600 proceeds to step 614, wherein the new CCC component (or a network device containing a new CCC component) sends a message to the control point component detailing the new device's capabilities (in a MX-DL format). From step 614, exemplary method 600 proceeds to step 615, wherein the control point component or the decentralized device control points provide the new device's capabilities (in a MX-DL format) to the player device or a storage component (e.g., a MSTOR component) accessible to the player device.

From step 615, exemplary method 600 proceeds to step 616, wherein exemplary method 600 returns to step 603 and proceeds as described above.

Returning to decision block 603, if a determination is made by the user not to incorporate a new CCC component into the network, exemplary method 600 proceeds to decision block 617. At decision block 617, a determination is made by the user whether to use the media item "as is" in the player device. If a determination is made to use the media item "as is" in the player device, exemplary method 600 proceeds to step 618, wherein the media item is played "as is" in the player device. From step 618, exemplary method 600 proceeds to end block 619 where exemplary method 600 ends.

Returning to decision block 617, if a determination is made by the user not to use the media item "as is" in the player device, exemplary method 600 proceeds directly to end block 619 where exemplary method 600 ends.

In addition to the above-described media exchange description language (MX-DL), methods of determining an operability of a media item within a media exchange network, methods of communicating and facilitating a media content exchange within a media exchange network, and devices for performing the disclosed methods, computer readable medium having stored thereon computer-executable instructions for performing the above-described methods are also disclosed herein.

Computing systems are also disclosed herein. An exemplary computing system contains at least one application module usable on the computing system, wherein the at least one application module comprises application code loaded thereon, wherein the application code performs methods of communicating and facilitating a media content exchange within a media exchange network. The application code may be loaded onto one or more devices of the media exchange network (e.g., a computing system) using any of the above-described computer readable medium having thereon computer-executable instructions for providing communication protocols as described above.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the disclosed methods, computer readable medium, and computing systems should be assessed as that of the appended claims and any equivalents thereto.

What is claimed is:

1. A method of determining an operability of a media item within a media exchange network, comprising:
   comparing:
   a set of content parameters associated with the media item, the set of content parameters comprising a beginning media exchange description language (MX-DL) element designated <mediaXchange> and a closing MX-DL element designated </mediaXchange>, and two or more additional MX-DL elements between the beginning element and the closing element, the two or more additional MX-DL elements comprising at least two of:
   one or more primitive MX-DL elements specifying encoding data, encapsulation features, and/or content protection associated with the media item, a primitive MX-DL element comprising a beginning element designated <primitives > and a closing element designated </primitives>;
   one or more compound MX-DL elements specifying primitive combinations for the media item, a compound MX-DL element comprising a beginning element designated <compounds> and a closing element designated </compounds>;
   one or more restriction MX-DL elements specifying value ranges for primitives, a restriction MX-DL element comprising a beginning element designated <restrictions> and a closing element designated </restrictions>; and
   one or more encapsulation MX-DL elements specifying encapsulation types for primitives, an encapsulation MX-DL element comprising a beginning element designated <encapsulations> and a closing element designated </encapsulations>; and
   device capabilities of one or more devices within the media exchange network, the device capabilities comprising a beginning MX-DL element designated <mediaXchange> and a closing MX-DL element designated </mediaXchange>, and two or more additional MX-DL elements between the beginning element and the closing element, the two or more additional MX-DL elements comprising at least two of:
   one or more primitive MX-DL elements specifying codec functionality supported by a device, a primitive MX-DL element comprising a beginning element designated <primitives> and a closing element designated </primitives>;
   one or more compound MX-DL elements specifying primitive combinations supported by a device, a compound MX-DL element comprising a beginning element designated <compounds> and a closing element designated </compounds>;
   one or more restriction MX-DL elements specifying allowed values for primitives, a restriction MX-DL element comprising a beginning element designated <restrictions> and a closing element designated </restrictions>; and
   one or more encapsulation MX-DL elements specifying encapsulation types for primitives, an encapsulation MX-DL element comprising a beginning element designated <encapsulations> and a closing element designated </encapsulations>; and
   if the set of content parameters associated with the media item is not compatible with the device capabilities of one or more devices within the media exchange network,
   converting the set of content parameters into a compatible set of content parameters described in the media exchange description language (MX-DL) based upon the device capabilities of the one or more devices, and
   making the media item with the compatible set of content parameters accessible to the one or more devices.

2. The method of claim 1, the set of content parameters associated with the media item and the compatible set of content parameters associated with the media item comprising one or more parameters selected from an audio parameter, a video parameter, an image encoding parameter, a content encapsulation parameter, a content protection parameter, a content encryption parameter, a bit-rate limitation parameter, a screen format conversion parameter, display resolution parameters, channel mode audio parameters, number or audio and video channels, geographical display and frequency parameters, geographical standardization parameters, display frame rate parameters, frequency range parameters, color map parameters, signal quantization parameters, chroma parameters, or a combination thereof.

3. The method of claim 1, the converting comprising formatting the media item to a format compatible with the device capabilities of the one or more devices.

4. The method of claim 1, the method comprising:
   receiving the media item from a media source outside the media exchange network.

5. The method of claim 4, the media source comprising a digital television signal source, a digital radio signal source, a DVD, a CD, a digital picture camera, a digital video camera, an Internet video service, an Internet radio service, content downloaded from the Internet, a cell phone network, a portable music device, a PDA, analog television, analog radio, microphones, or a combination thereof.

6. The method of claim 1, making the media item with the compatible set of content parameters accessible to the one or more devices comprising storing the media item in a storage component that is accessible to a device configured to utilize the media item or sending the media item directly to the device configured to utilize the media item.

7. The method of claim 1, the one or more devices within the media exchange network selected from a digital television, a digital television tuner, a digital radio player, a DVD video player, a CD player, a cellular phone, a personal computer, a laptop computer, a computer, a microprocessor, a device configured to convert a set of content parameters for a media item into a compatible set of content parameters for the media item based on the device capabilities of one or more devices within the media exchange network, or a combination thereof.

8. The method of claim 7, the one or more devices within the media exchange network comprising a device configured to convert a set of content parameters for a media item into a compatible set of content parameters for the media item based on the device capabilities of one or more devices within the media exchange network upon receiving a request for the conversion.

9. The method of claim 1, the media exchange description language (MX-DL) describing the set of content parameters and the device capabilities as one or more MX-DL elements using an extensible mark-up language.

10. The method of claim 1, the set of content parameters associated with the media item compatible with the device capabilities of one or more devices within the media exchange network, but a receiving device in the media exchange network comprising limited hardware functionality in order to convert the media item into a high quality media file, the method comprising:

making the media item accessible to a second device having greater hardware functionality than the receiving device;

utilizing the second device to convert the media item into a high quality media file; and allowing access to the high quality media file by any of the one or more devices.

11. The method of claim 1, the set of content parameters associated with the media item compatible with the device capabilities of one or more devices within the media exchange network, but a player device in the media exchange network comprising limited playback capabilities for the media item, the method comprising:

making the media item accessible to a second device configured to convert the media item into a media format that matches optimum playback capabilities of the player device;

utilizing the second device to convert the media item into the media format that matches the optimum playback capabilities of the player device; and allowing access to the converted media item by any of the one or more devices.

12. A tangible computer readable storage medium having stored thereon computer-executable instructions for performing the method of claim 1.

13. A tangible computer readable storage medium having stored thereon computer-executable instructions for facilitating media exchange in a media exchange network, said computer-executable instructions configured to perform a method when executed via a microprocessor, the method comprising comparing:

a set of content parameters associated with a media item, the set of content parameters comprising a beginning media exchange description language (MX-DL) element designated <mediaXchange> and a closing MX-DL element designated </mediaXchange>, and two or more additional MX-DL elements between the beginning element and the closing element, the two or more additional MX-DL elements comprising at least two of:

one or more primitive MX-DL elements specifying encoding data, encapsulation features, and/or content protection associated with the media item, a primitive MX-DL element comprising a beginning element designated <primitives> and a closing element designated </primitives>;

one or more compound MX-DL elements specifying primitive combinations for the media item, a compound MX-DL element comprising a beginning element designated <compounds> and a closing element designated </compounds>;

one or more restriction MX-DL elements specifying value ranges for primitives, a restriction MX-DL element comprising a beginning element designated <restrictions> and a closing element designated </restrictions>; and one or more encapsulation MX-DL elements specifying encapsulation types for primitives, an encapsulation MX-DL element comprising a beginning element designated <encapsulations> and a closing element designated </encapsulations>; and device capabilities of one or more devices within the media exchange network, the device capabilities comprising a beginning MX-DL element designated <mediaXchange> and a closing MX-DL element designated </mediaXchange>, and two or more additional MX-DL elements between the beginning element and the closing element, the two or more additional MX-DL elements comprising at least two of:

one or more primitive MX-DL elements specifying codec functionality supported by a device, a primitive MX-DL element comprising a beginning element designated <primitives> and a closing element designated </primitives>;

one or more compound MX-DL elements specifying primitive combinations supported by a device, a compound MX-DL element comprising a beginning element designated <compounds> and a closing element designated </compounds>;

one or more restriction MX-DL elements specifying allowed values for primitives, a restriction MX-DL element comprising a beginning element designated <restrictions> and a closing element designated </restrictions>; and one or more encapsulation MX-DL elements specifying encapsulation types for primitives, an encapsulation MX-DL element comprising a beginning element designated <encapsulations> and a closing element designated </encapsulations>; and if the set of content parameters associated with the media item is not compatible with the device capabilities of one or more devices within the media exchange network, converting the set of content parameters into a compatible set of content parameters described in the media exchange description language (MX-DL) based upon the device capabilities of the one or more devices, and making the media item with the compatible set of content parameters accessible to the one or more devices.

14. The tangible computer readable storage medium of claim 13, one or more primitives describing a codec format, a profile of the codec format, and a level value, if any, for the codec format.

15. The tangible computer readable storage medium of claim 13, the one or more compound MX-DL elements identifying at least one of capabilities of a given device and a collection of primitives used to encode a content item.

16. A media exchange network comprising at least one computing device, said computing device configured to execute the computer readable medium of claim 13.

17. A device or device component configured to:

compare:

a set of content parameters associated with a media item, the set of content parameters comprising a beginning media exchange description language (MX-DL) element designated <mediaXchange> and a closing MX-DL element designated </mediaXchange>, and two or more additional MX-DL elements between the beginning element and the closing element, the two or more additional MX-DL elements comprising at least two of:

one or more primitive MX-DL elements specifying encoding data, encapsulation features, and/or content protection associated with the media item, a primitive MX-DL element comprising a beginning element designated <primitives > and a closing element designated </primitives>;

one or more compound MX-DL elements specifying primitive combinations for the media item, a compound MX-DL element comprising a beginning element designated <compounds> and a closing element designated </compounds>;

one or more restriction MX-DL elements specifying value ranges for primitives, a restriction MX-DL element comprising a beginning element designated <restrictions> and a closing element designated </restrictions>; and one or more encapsulation MX-DL elements specifying encapsulation types for primitives, an encapsulation MX-DL element comprising a beginning element designated <encapsulations> and a closing element designated </encapsulations>; and device capabilities of one or more devices within a media exchange network, the device capabilities comprising a beginning MX-DL element designated <mediaXchange> and a closing MX-DL element designated </mediaXchange>, and two or more additional MX-DL elements between the beginning element and the closing element, the two or more additional MX-DL elements comprising at least two of:

one or more primitive MX-DL elements specifying codec functionality supported by a device, a primitive MX-DL element comprising a beginning element designated <primitives> and a closing element designated </primitives>;

one or more compound MX-DL elements specifying primitive combinations supported by a device, a compound MX-DL element comprising a beginning element designated <compounds> and a closing element designated </compounds>;

one or more restriction MX-DL elements specifying allowed values for primitives, a restriction MX-DL element comprising a beginning element designated <restrictions> and a closing element designated </restrictions>; and one or more encapsulation MX-DL elements specifying encapsulation types for primitives, an encapsulation MX-DL element comprising a beginning element designated <encapsulations> and a closing element designated </encapsulations>; and if the set of content parameters associated with the media item is not compatible with the device capabilities of one or more devices within the media exchange network, convert the set of content parameters into a compatible set of content parameters described in the media exchange description language (MX-DL) based upon the device capabilities of the one or more devices, and make the media item with the compatible set of content parameters accessible to the one or more devices.

\* \* \* \* \*